US012683068B2

(12) United States Patent
Maeda et al.

(10) Patent No.: US 12,683,068 B2
(45) Date of Patent: Jul. 14, 2026

(54) COIL DEVICE

(71) Applicants: TDK CORPORATION, Tokyo (JP); TDK XIAMEN CO., LTD., Xiamen (CN)

(72) Inventors: Hiroshi Maeda, Xiamen (CN); Shoichi Tani, Tokyo (JP); Takahiro Hirai, Tokyo (JP); Xiao Jie, Xiamen (CN); Danling Luo, Xiamen (CN); Xuesong Guo, Xiamen (CN)

(73) Assignees: TDK CORPORATION, Tokyo (JP); TDK XIAMEN CO., LTD., Xiamen (CN)

( * ) Notice: Subject to any disclaimer, the term of this patent is extended or adjusted under 35 U.S.C. 154(b) by 779 days.

(21) Appl. No.: 18/190,276

(22) Filed: Mar. 27, 2023

(65) Prior Publication Data

US 2023/0317364 A1 Oct. 5, 2023

(30) Foreign Application Priority Data

Mar. 29, 2022 (CN) ........................ 202210324249.2

(51) Int. Cl.
*H01F 27/30* (2006.01)
*H01F 27/26* (2006.01)
*H01F 27/28* (2006.01)
*H01F 27/29* (2006.01)

(52) U.S. Cl.
CPC ......... *H01F 27/306* (2013.01); *H01F 27/266* (2013.01); *H01F 27/2823* (2013.01); *H01F 27/292* (2013.01)

(58) Field of Classification Search
CPC .. H01F 27/306; H01F 27/266; H01F 27/2823; H01F 27/292
See application file for complete search history.

(56) References Cited

U.S. PATENT DOCUMENTS

2009/0108979 A1* 4/2009 Kosugi ................ H01F 27/326 336/208
2011/0043315 A1* 2/2011 Kobayashi ........... H01F 27/325 29/606
2011/0187485 A1* 8/2011 Toyoda ................ H01F 27/306 336/192
2014/0159852 A1* 6/2014 Miura .................... H01F 27/02 336/208
2019/0080836 A1* 3/2019 Yasuda .................. H01F 27/29
2019/0214189 A1* 7/2019 Chou ................. H01F 27/2823
2022/0102050 A1* 3/2022 Monma ................ H01F 27/325

FOREIGN PATENT DOCUMENTS

JP H05-093024 U 12/1993
JP 2009117627 A * 5/2009

* cited by examiner

*Primary Examiner* — Malcolm Barnes
(74) *Attorney, Agent, or Firm* — Oliff PLC

(57) ABSTRACT

A coil device includes a bobbin, a main core, and wires. A connection portion located between a first bobbin flange portion and a second bobbin flange portion includes a raised portion protruding along a direction perpendicular to a first axis more than the connection portion located between a first terminal block and a first bobbin flange portion. Communication wire portions connecting first wires of a proximal first coil and first wires of a distal first coil are arranged in a wiring space formed between second wires wound in contact with an upper end of the raised portion and an outer surface of the winding core portion or the bobbin.

13 Claims, 22 Drawing Sheets

COIL DEVICE

BACKGROUND OF THE INVENTION

The present invention relates to a coil device favorably used for transformers, such as pulse transformers.

As a coil device used for transformers or the like, a coil device in which a primary coil and a secondary coil are divided along a winding core portion of a core is known as shown, for example, in Patent Document 1 below.

In the conventional coil device, however, the primary coil and the secondary coil are clearly separated on the first terminal block side and the second terminal block side along the winding core portion of the core, which is favorable from the viewpoint of insulation, but there is a problem that the coupling between the primary coil and the secondary coil is weak. If this coupling is weak, there is a problem that it is difficult to favorably use the coil device as a pulse transformer.

Patent Document 1: JPH0593024 (U)

BRIEF SUMMARY OF INVENTION

The present invention has been achieved under such circumstances. It is an object of the invention to provide a coil device having a high coupling between a primary coil and a secondary coil and being excellent in insulation.

To achieve the above object, a coil device according to the present invention comprises:

a bobbin;

a main core; and a wire, wherein the bobbin comprises:

- a connection portion covering at least a surface of a winding core portion of the main core and wound by the wire together with the winding core portion;
- a first terminal block disposed at one end of the connection portion along a first axis; and
- a second terminal block disposed at the other end of the connection portion along the first axis, the wire comprises at least:

- a first wire; and
- a second wire, the bobbin comprises:

- a first bobbin flange portion disposed separately from the first terminal block at a predetermined interval along the first axis; and
- a second bobbin flange portion disposed separately from the first bobbin flange portion at a predetermined interval along the first axis, the first wire is wound around the winding core portion and the connection portion located between the first terminal block and the first bobbin flange portion so as to constitute a proximal first coil, the second wire is wound around the winding core portion and the connection portion located between the first bobbin flange portion and the second bobbin flange portion so as to constitute an intermediate second coil, the first wire is wound around the winding core portion and the connection portion located between the second bobbin flange portion and the second terminal block or between the second bobbin flange portion and a third bobbin flange portion so as to constitute a distal first coil, the connection portion located between the first bobbin flange portion and the second bobbin flange portion comprises a raised portion protruding along a direction perpendicular to the first axis more than the connection portion located between the first terminal block and the first bobbin flange portion, and a communication wire portion of the first wire connecting the first wire of the proximal first coil and the first wire of the distal first coil is disposed in a wiring space formed between the second wire wound in contact with a tip of the raised portion and an outer surface of the winding core portion or the bobbin.

In the coil device according to the present invention, the intermediate second coil is disposed so as to be sandwiched between the proximal first coil and the distal first coil along a core axis (first axis) of the winding core portion of the core. In addition, the proximal first coil and the distal first coil are continuously formed by the first wire consisting of one or more wires.

Thus, for example, when the intermediate second coil functions as a secondary coil and the proximal first coil and the distal first coil function as a primary coil, the coupling between the primary coil and the secondary coil can be improved. Thus, the coils can be favorably used for transformers such as pulse transformers. Note that, this is also the case even if the primary coil and the secondary coil are reversed.

Since the connection portion of the bobbin includes the raised portion, the wiring space can be formed between the second wire wound in contact with the tip of the raised portion and the outer surface of the winding core portion or the bobbin. The wiring space is partially (preferably, at one or more places) formed inside along the circumferential direction of the intermediate second coil.

The first wire (communication wire portion) is passed between the proximal first coil and the distal first coil via the wiring space, and the first wires constituting the proximal first coil and the distal first coil become continuous. Thus, the first wire and the second wire can be insulated favorably.

Moreover, in the coil device of the present embodiment, since the bobbin flange portions are arranged between the proximal first coil and the intermediate second coil and between the intermediate second coil and the distal first coil, the insulation between the coils is favorably secured. Thus, compared to a coil device such as a transformer where a primary coil and a secondary coil are wound in layers, high performance insulation properties of the insulation coating of the wire itself are not required, which contributes to wider selection of wires and cost reduction.

In the coil device of the present embodiment, compared to a coil device such as a transformer where a primary coil and a secondary coil are wound in layers, the winding outer diameter of the wire can be reduced, and the height of the coil device can be reduced.

Preferably, the raised portion protrudes along a direction perpendicular to the first axis more than the connection portion located between the second terminal block and the second bobbin flange portion. The direction perpendicular to the first axis is, for example, a second axis and a third axis, but may be between those axes. For example, the first axis is parallel to the core axis of the winding core portion, the third axis is a direction perpendicular to a mounting surface of the coil device, and the first axis, the second axis, and the third axis are perpendicular to each other. The raised portion may be a pair of raised upper ends separately formed on the connection portion in the second axis direction.

The second bobbin flange portion may comprise a guide portion for guiding the second wire from the intermediate second coil towards the second terminal block, and the second wire guided via the guide portion may be wired in the air above the distal first coil and go to the second terminal block. In such a configuration, the leading portion of the second wire from the intermediate second coil and the distal first coil can be insulated favorably.

The second wire from the intermediate second coil may be connected to a second terminal attached to the second terminal block via the guide portion. In such a configuration, the leading portion of the second wire from the intermediate second coil can be connected to a terminal of the terminal block while securing insulation.

The guide portion comprises a guide groove recessed from an outer circumferential edge of the second bobbin flange portion, preferably, at a position different from that of the raised portion along a circumferential direction (or at substantially the same position). For example, also preferably, the raised portion is formed at the connection portion on the anti-mounting surface side, and the guide groove is formed at the bobbin flange portion located on the mounting surface side.

The connection portion may further comprise a third bobbin flange portion. For example, the second wire may be wound around the winding core portion and the connection portion located between the third bobbin flange portion and the second bobbin flange portion so as to constitute a distal second coil. The second wire wound in the intermediate second coil and the second wire wound in the distal second coil may be continuous via the guide portion. In such a configuration, the distal first coil is sandwiched between the intermediate second coil and the distal second coil along the core axis (first axis) direction of the winding core portion, and the coupling between the coil group consisting of the first wire and the coil group consisting of the second wire is further improved.

The second wire from the distal second coil may be connected to a second terminal attached to the second terminal block. The first wire from the proximal first coil may be connected to a first terminal attached to the first terminal block.

The raised portion of the bobbin may protrude towards a mounting surface and/or an anti-mounting surface. Instead, the raised portion of the bobbin may protrude towards a direction parallel to a mounting surface. Preferably, however, the raised portion of the bobbin protrudes towards the anti-mounting side and is a pair protruding from both sides of the bobbin in the second axis towards the anti-mounting side. In such a configuration, the wiring space is easily formed inside the intermediate second coil. In addition, the winding operation of the wires around the winding core portion and the bobbin becomes easy, and the winding operation is easily automated.

Note that, preferably, the wiring space is formed at one place inside the intermediate second coil, and the radial winding position of the second wire constituting the intermediate second coil is substantially the same as the radial winding position of the first wire constituting the proximal first coil and/or the distal first coil in a portion other than the wiring space formed by the raised portion. In such a configuration, the coupling of these coils is improved.

The main core may comprise a pair of core flange portions provided at both ends along a winding axis of the winding core portion. Moreover, each of the terminal blocks may be formed with a flange accommodation recess for accommodating each of the core flange portions.

Preferably, the first terminal block and the second terminal block are integrally formed with the connection portion, and the connection portion comprises at least a pair of connection side portions covering both sides of the winding core portion. Moreover, the first wire or the second wire may be continuously wound so as to contact with an upper surface or a lower surface of the winding core portion.

Preferably, the connection portion further comprises a bottom wall formed by integrating the pair of connection side portions and covering the lower surface of the winding core portion. Preferably, the first wire is continuously wound so as to contact with the pair of connection side portions and the bottom wall and contact with the upper surface of the winding core portion or an upper end of the connection side portions. In such a configuration, the coil device can be reduced in height and size, the wire winding operation becomes easy, and the inductance of the coil device is improved.

DETAILED DESCRIPTION OF INVENTION

Hereinafter, the present invention is described based on embodiments shown in the figures.

First Embodiment

Figure 1:
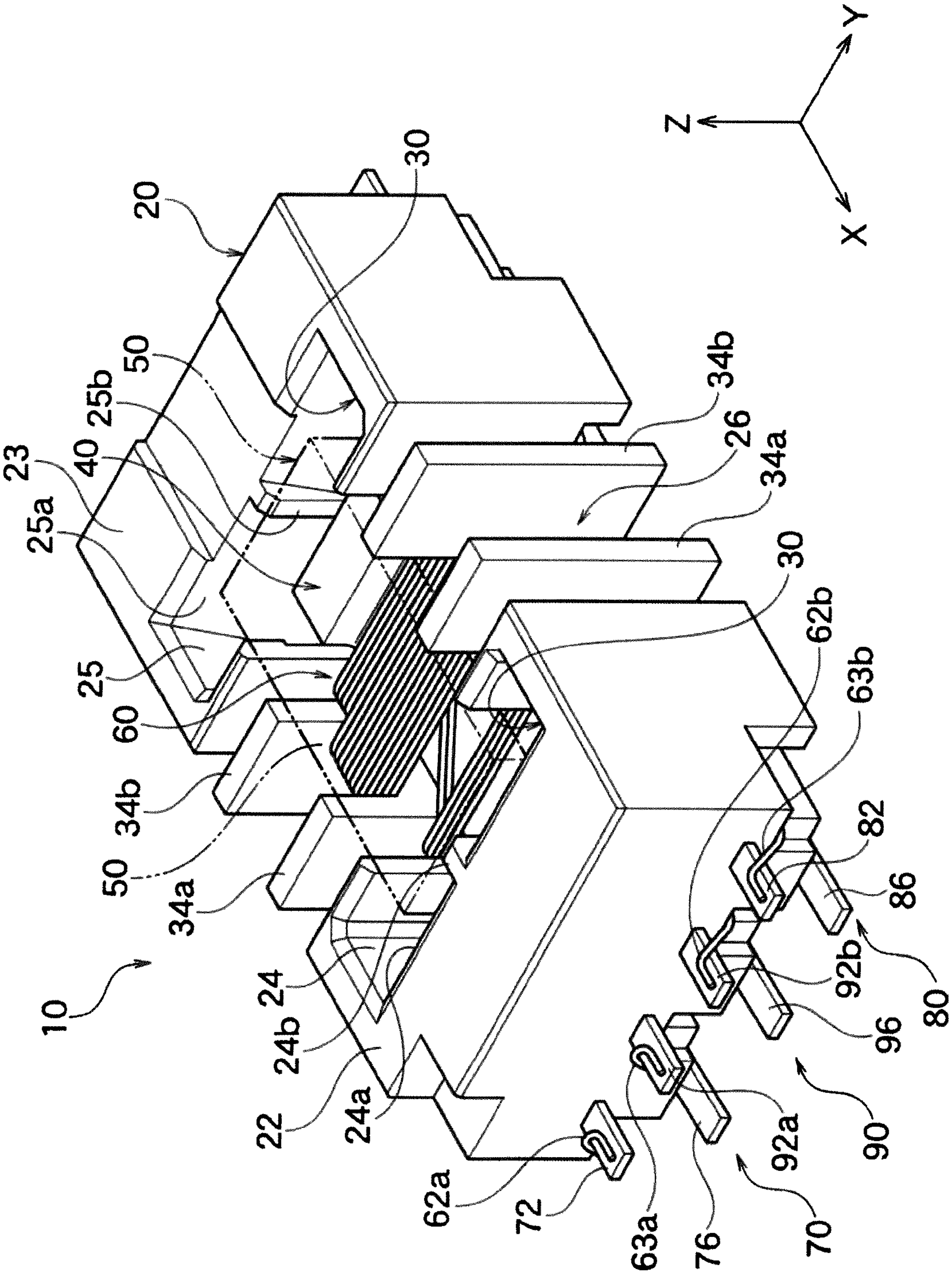
FIG. 1 is a perspective view of a coil device according to an embodiment of the present invention.

A transformer 10 as a coil device according to the present embodiment shown in FIG. 1 is used as, for example, a pulse transformer. The transformer 10 may also be used for, for example, voltage conversion of a battery of a vehicle, such as a car, or voltage conversion of a battery of an electronic device and is used for any application. The transformer 10 includes a bobbin 20, a main core 40, a sub-core 50, and a coil 60.

Figure 5:
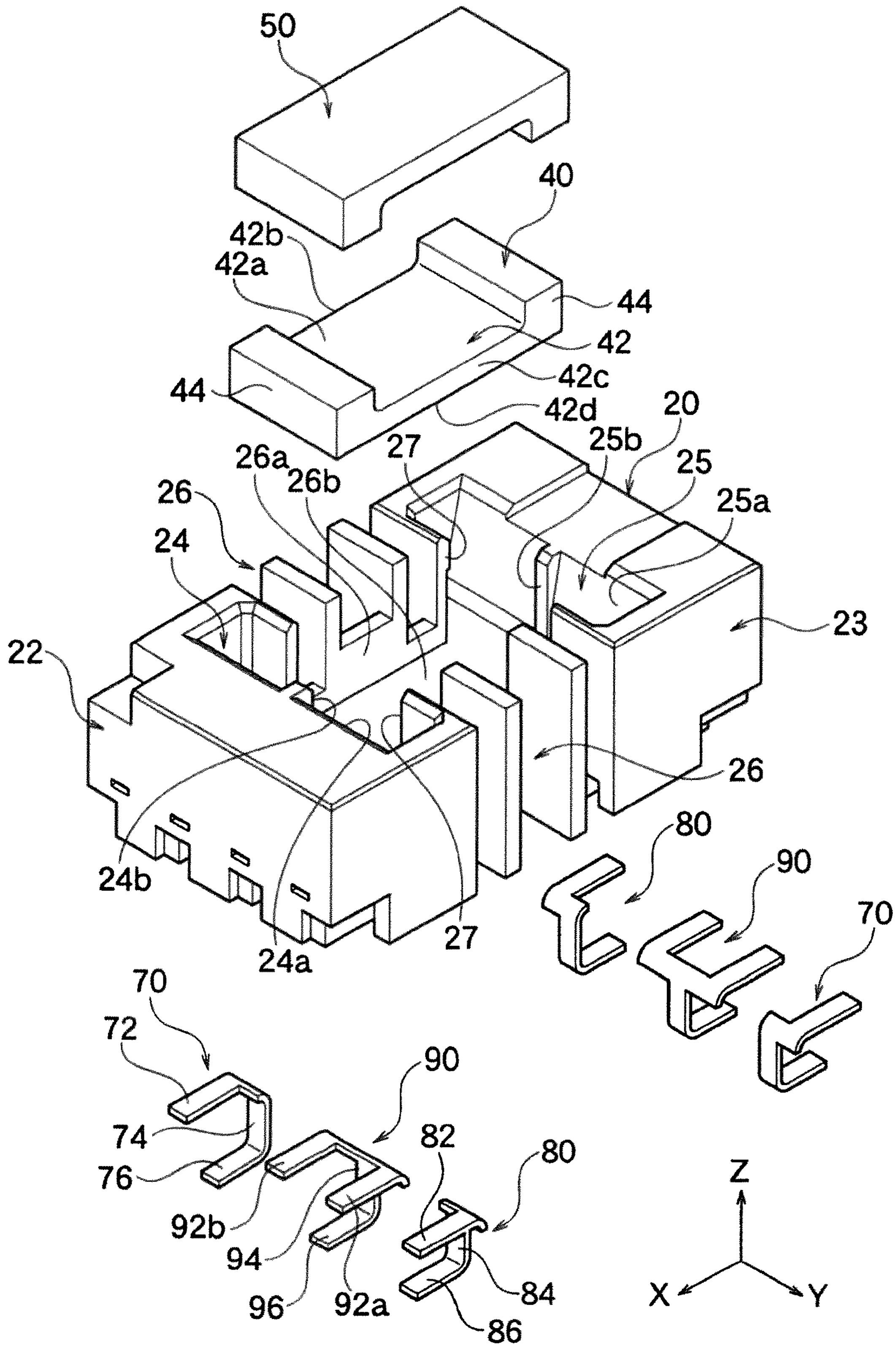
FIG. 5 is an exploded perspective view of the coil device shown in FIG. 1 (no wires are illustrated)

As shown in FIG. 5, the bobbin 20 includes a pair of terminal blocks 22 and 23 arranged at both ends in the X-axis direction. The terminal blocks 22 and 23 are integrated by a connection portion 26. The terminal blocks 22 and 23 are formed with flange accommodation recesses 24 and 25, respectively, having an opening in the upper part in the Z-axis direction. Preferably, the opening inner walls of the flange accommodation recesses 24 and 25 are formed with guide pieces **24*b* and 25*b* protruding from tapered inclined surfaces 24*a* and 25*a* in the X-axis direction, respectively, so that core flange portions 44 of the main core 40** are easily positioned in the X-axis direction and inserted.

In the figures, the X-axis, the Y-axis, and the Z-axis are substantially perpendicular to each other. In the present embodiment, the X-axis substantially coincides with the extending direction of the connection portion 26 (also substantially coincides with the winding axis direction of the coil 60), the Y-axis coincides with the extending direction of the core flange portions 44 and 44, the Z-axis coincides with the height direction of the transformer 10, and the lower side of the Z-axis is the mounting surface side.

As shown in FIG. 5, the main core 40 includes a flat winding core portion 42 and a pair of core flange portions 44 positioned at both ends of the core portion 42 in the X-axis direction. Each of the core flange portions 44 has substantially the same width in the Y-axis direction as the winding core portion 42, but may have the width in the Y-axis direction different from or larger or smaller than that of the winding core portion 42. The lower surface of the winding core portion 42 is preferably substantially flush with the lower surfaces of the core flange portions 44, but may have a step.

The sub-core 50 is formed as a separate member from the main core 40. The sub-core 50 has substantially the same length in the X-axis direction as the main core 40 (hereinafter, also simply referred to as "length") and has substantially the same width in the Y-axis direction as the winding core portion 42 (hereinafter, also simply referred to as "width"). The thickness of the sub-core 50 may be the same as or different from the thickness of the winding core portion 42 and is preferably 70 to 130% of the thickness of the winding core portion 42. In the present embodiment, the sub-core 50 has a similar configuration to the main core 40 and may have exactly the same configuration as the main core 40, but the sub-core 50 may be simply a flat plate.

Figure 2:
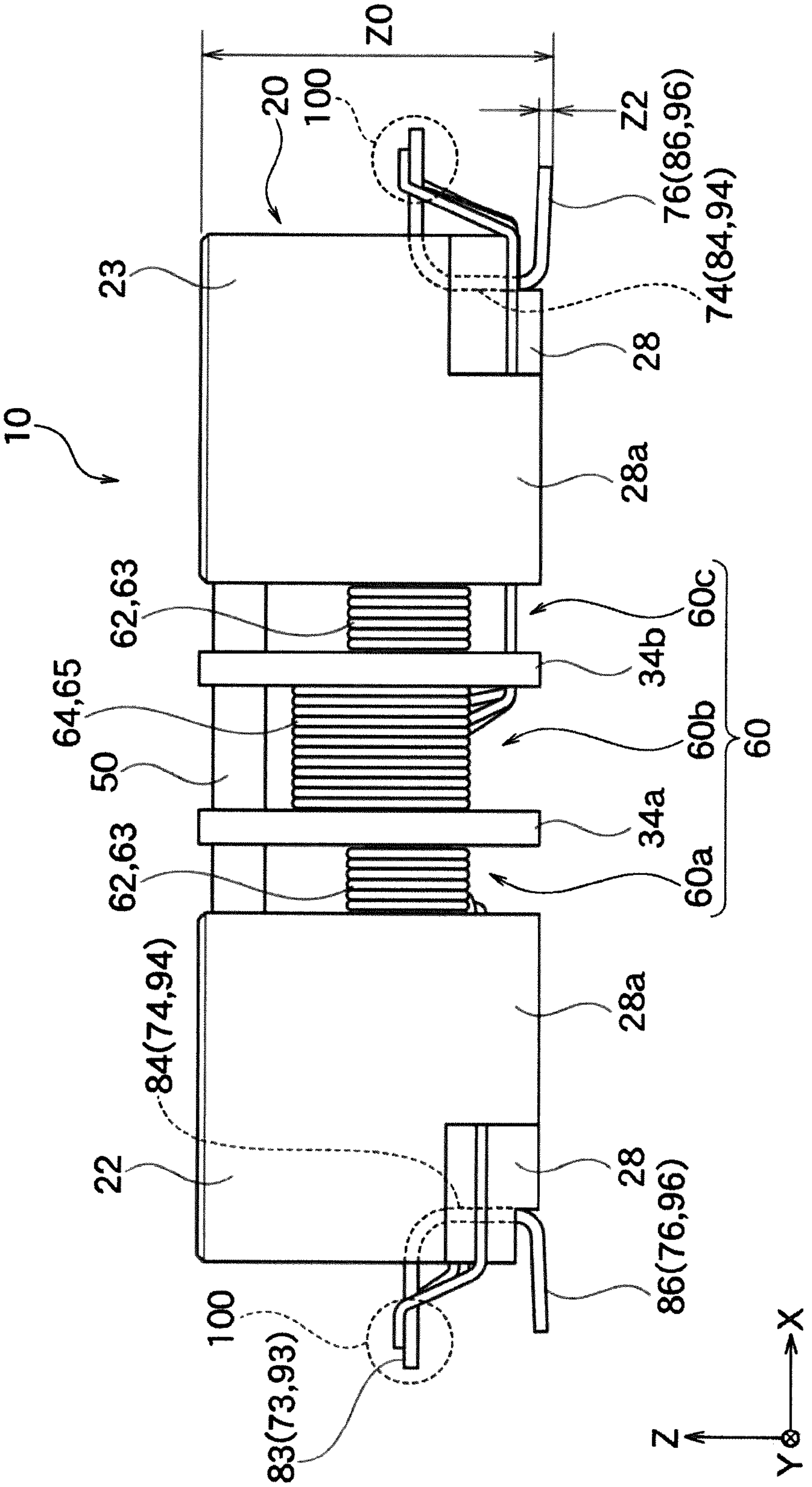
FIG. 2 is a side view of the coil device shown in FIG. 1.
Figure 7:
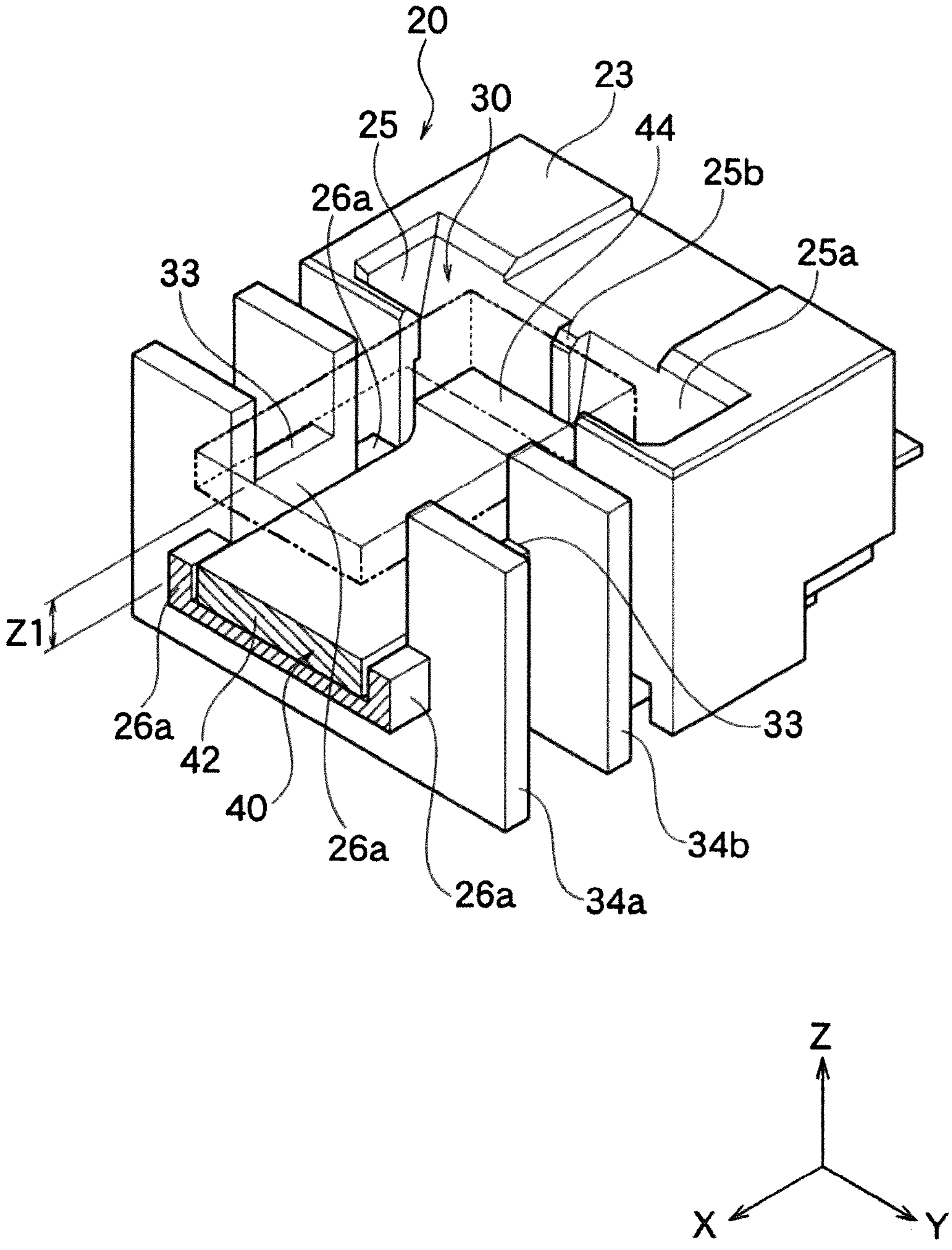
FIG. 7 is a perspective view including a horizontal cross section (X-Z cross section) of the coil device shown in FIG. 1 (no wires are illustrated)

The height of the step from the upper surface of the winding core portion 42 to the upper surfaces of the core flange portions 44 (the same applies to the sub-core 50) is also related to the height of raised portions 33 shown in FIG. 7 and is determined so that the outer circumferences of wires 64 and 65 constituting a coil **60*b* shown in FIG. 2 are not contacted with the inner ceiling surface of the sub-core 50**.

The material of the main core 40 is a metal or a magnetic material such as ferrite, but is not limited. The sub-core 50 is preferably made of a magnetic material similar to that of the main core 40, but is not necessarily made of the same magnetic material. The sub-core 50 may be made of a non-magnetic material such as synthetic resin.

In the bobbin 20 of the present embodiment, the connection portion 26 includes a pair of connection side portions **26*a* and 26*a* having a plate wall shape and a bottom wall 26*b* having a flat plate shape connecting the connection side portions 26*a* and 26*a* so as to integrate them. The pair of terminal blocks 22 and 23 is formed integrally with the pair of connection side portions 26*a* and the bottom wall 26*b* and covers the entire lower surface and the side wall of the winding core portion 42 of the main core 40. Preferably, the upper surface of the bottom wall 26*b* is substantially flush with the bottom surfaces of the flange accommodation recesses 24 and 25**.

Figure 6:
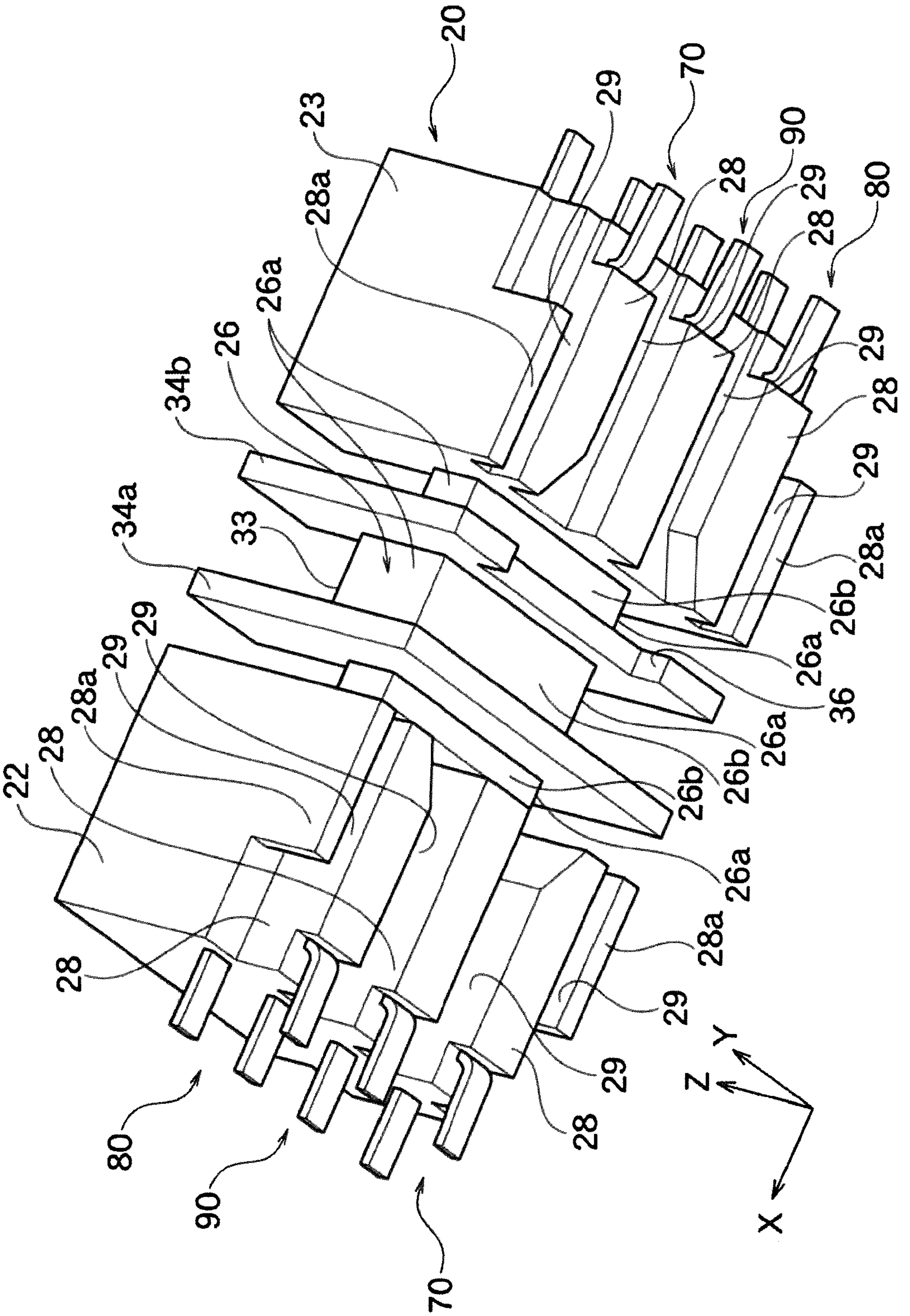
FIG. 6 is a perspective view of a bobbin shown in FIG. 5 viewed from the bottom surface side.

As shown in FIG. 6, a first bobbin flange portion **34*a* and a second bobbin flange portion 34*b* are formed at a predetermined interval along the X-axis in order from the vicinity of one terminal block (first terminal block) 22 on the outer surface of the connection portion 26 (the connection side portion 26*a* and the bottom wall 26*b*). The first bobbin flange portion 34*a* and the second bobbin flange portion 34*b* are formed so as to protrude outward in the Y-axis direction and outward in the Z-axis direction from the outer surface of the connection portion 26**.

The flange portions **34*a* and 34*b* have substantially the same shape, but a guide groove 36 recessed inward in the Z-axis from the second flange 34*b* protruding outward from the bottom wall 26*b* is formed on the lower side (mounting surface side) of the second flange portion 34*b* in the Z-axis. Note that, the term "outward" means the direction away from the center (center of gravity) of the transformer 10, and the term "inward" means the direction closer to the center (center of gravity) of the transformer 10**.

In the present embodiment, as shown in FIG. 7, the upper surfaces of the connection side portions **26*a* located between the first bobbin flange portion 34*a* and the first terminal block 22 (see FIG. 1) are preferably located substantially on the same plane as the upper surface of the winding core portion 42 or lower than the upper surface of the winding core portion 42 in the Z-axis, but may be higher than the upper surface of the winding core portion 42 in the Z-axis. Likewise, the upper surfaces of the connection side portions 26*a* located between the second bobbin flange portion 34*b* and the second terminal block 23 are preferably located substantially on the same plane as the upper surface of the winding core portion 42 or lower than the upper surface of the winding core portion 42 in the Z-axis, but may be higher than the upper surface of the winding core portion 42** in the Z-axis.

The raised portion 33 protruding towards the anti-mounting side along the Z-axis direction is formed on each of the connection side portions **26*a* located between the first bobbin flange portion 34*a* and the second bobbin flange portion 34*b*. The height of the upper ends (tips) of the raised portions 33 along the Z-axis is configured to be larger than the height of the upper surfaces of the connection side portions 26*a* located on both sides of the raised portions 33 in the X-axis direction by a predetermined height Z1. The predetermined height Z1 is larger than zero and is preferably larger than one wire diameter (d1/not illustrated) of the first wires 62 and 63 constituting the coil 60 shown in FIG. 2**.

The predetermined height Z1 is more preferably larger than twice the wire diameter d1 and is still more preferably three times or more, five times or more, or seven times or more the wire diameter d1. Preferably, the predetermined height Z1 is 10 times or less, eight times or less, or 7.2 times or less the wire diameter d1. If the predetermined height Z1 is too small, a wiring space 66 for passing communication wire portions 62*a*1, 63*a*1, 62*b*1, and 63*b*1 of the wires 62 and 63 shown in FIG. 10A tends to be too small. If the predetermined height Z1 is too large, the difference between the height of the second wires 64 and 65 in the Z-axis located in the raised portions 33 and the height of the first wires 62 and 63 in the Z-axis located on both sides of the raised portions 33 in the X-axis direction tends to be too large, and the coupling between the coils tends to be weak.

As shown in FIG. 5, notches 27 are formed in the walls located at the boundaries between the terminal blocks 22 and 23 of the bobbin 20 and the connection portions 26. The width of each of the notches 27 is equal to or larger than the width of the winding core portion 42 and is substantially the same as the distance between the connection side portions 26*a* in the Y-axis direction. The height of each of the notches 27 is substantially the same as the depth (height) of each of the flange accommodation recesses 24 and 25.

The boundary portions between the winding core portion 42 and the core flange portions 44 of the main core 40 are inserted via the notches 27, and the core flange portions 44 are accommodated into the flange accommodation recesses 24 and 25. In the connection portion 26, the winding core portion 42 is placed on the upper surface of the bottom wall 26*b* in the Z-axis direction and disposed between the pair of connection side portions 26*a* and 26*a*. Both ends of the sub-core 50 different from the main core 40 are inserted into the upper portions of the notches 27. As shown in FIG. 2, the upper surface of the sub-core 50 is substantially the same plane as the upper surfaces of the terminal blocks 22 and 23, but may be different from the upper surfaces of the terminal blocks 22 and 23.

As shown in FIG. 5, three terminals 70, 90, and 80 are attached to each of the terminal blocks 22 and 23 of the bobbin 20. The terminal 70 and the terminal 80 have shapes that are axisymmetrical to each other and have similar components, but are not completely the same members. Unlike the terminal 70 and the terminal 80, the terminal 90 disposed between the terminal 70 and the terminal 80 in the Y-axis direction includes two wire connection portions 92*a* and 92*b*.

The terminal 70 includes a wire connection portion 72, an embedded portion 74, and a mounting portion 76, and these portions are integrally formed from a conductive plate material, such as a metal piece, by press working or the like. The terminal 80 includes a wire connection portion 82, an embedded portion 84, and a mounting portion 86, and these portions are integrally formed from a conductive plate material, such as a metal piece, by press working or the like. Note that, the wire connection portions 72 and 82 may be formed integrally with a crimping piece for fixing the leading portion. The conductive material constituting the terminals 70 and 80 is not limited and is, for example, a metal, such as phosphor bronze, tough pitch steel, oxygen-free steel, stainless steel, brass, and copper-nickel alloy.

The terminal 90 is a terminal used as, for example, an intermediate tap and includes two wire connection portions 92*a* and 92*b*, an embedded portion 94 integrally formed to connect them, and a single mounting portion 96*a* continuing to the lower end of the embedded portion 94. As with the terminals 70 and 80, the terminal 90 is also integrally formed from a conductive plate material, such as a metal piece, by press working or the like. Each of the wire connection portions 92*a* and 92*b* may be formed integrally with a crimping piece for fixing the leading portion. The conductive material constituting the terminal 90 may be the same material as the terminals 70 and 80, but is not necessarily the same.

As shown in FIG. 2, the embedded portions 74, 84, and 94 of the terminals 70, 80, and 90 are embedded in an insulating material constituting the bobbin 20 at the lower portions of the terminal blocks 22 and 23 in the Z-axis direction on the outer side of the terminal blocks 22 and 23 in the X-axis direction. Preferably, the embedded portions 74, 84, and 94 are embedded in the insulating material constituting the bobbin 20 without being exposed on the inner wall surfaces of the flange accommodation recesses 24 and 25 of the terminal blocks 22 and 23.

The insulating material constituting the bobbin 20 is not limited and is, for example, a synthetic resin such as LCP, nylon, phenol, DAP, PBT, and PET. Each of the terminals 70 and 80 is insert-molded and integrated with the bobbin 20 at the time of forming the bobbin 20.

As shown in FIG. 2, the mounting portions 76, 86, and 96 of the terminals 70, 80, and 90 are attached to the bobbin 20 so as to protrude outward in the X-axis direction from the end surfaces of the terminal blocks 22 and 23 on the lower surface (bottom surface) of the bobbin 20. The wire connection portions 72, 82, and 92 are attached to the bobbin 20 so as to protrude outward in the X-axis direction from the end surfaces of the terminal blocks 22 and 23 at a position higher than that of the mounting portions 76, 86, and 96 along the Z-axis.

Figure 3:
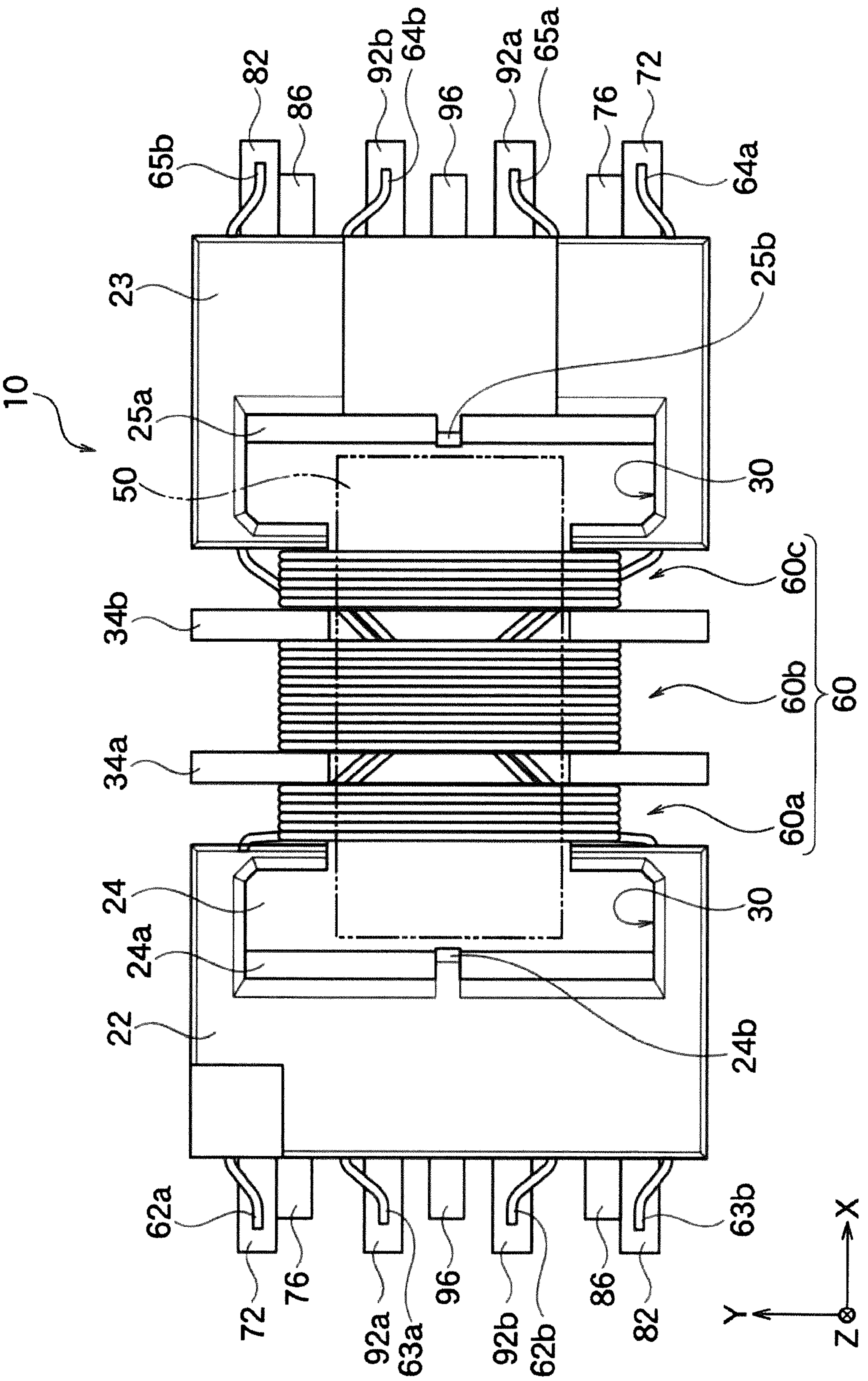
FIG. 3 is a plane view of the coil device shown in FIG. 1.
Figure 4A:
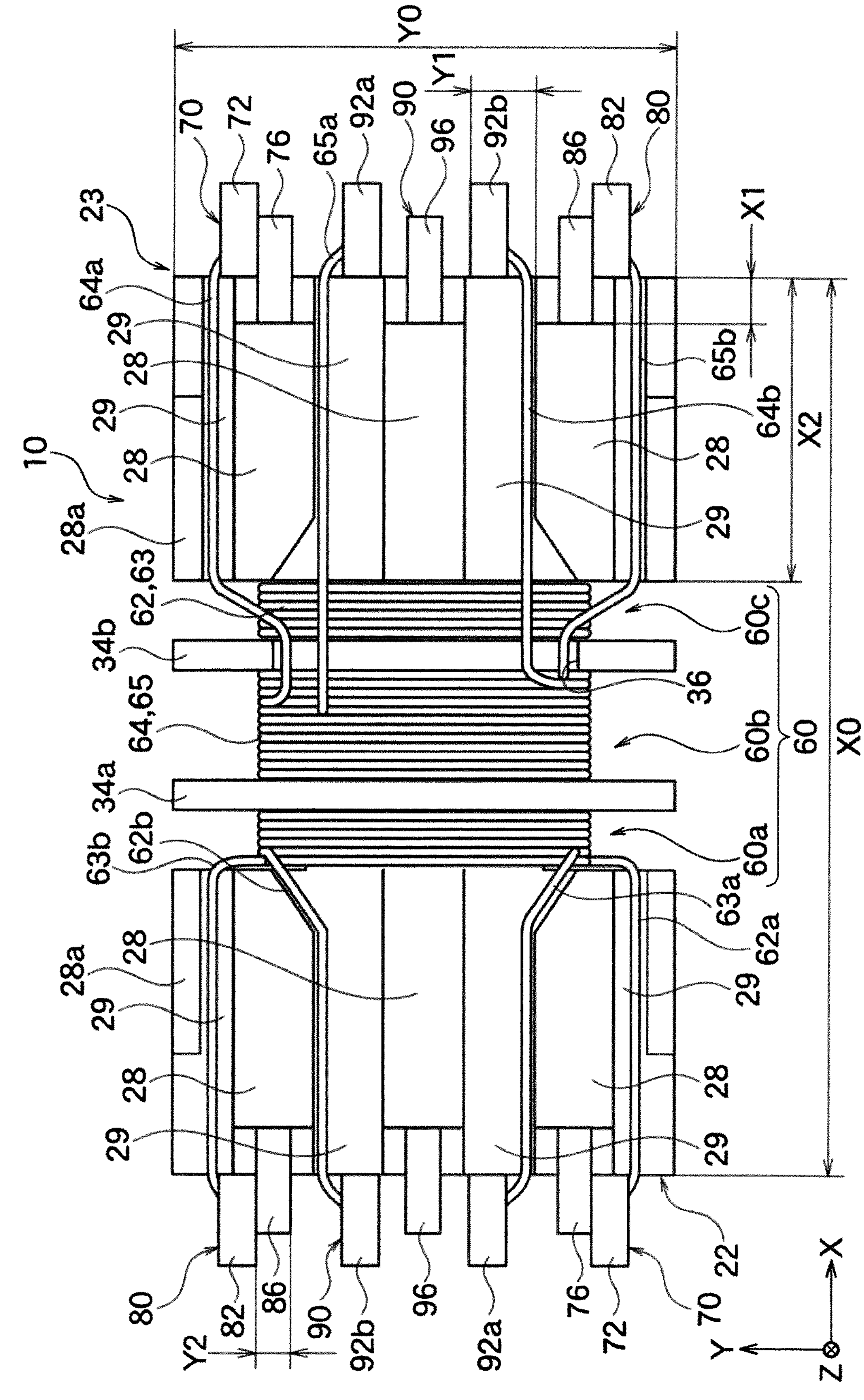
FIG. 4A is a bottom view of the coil device shown in FIG. 1.

As shown in FIG. 3 and FIG. 4A, the arrangement of the wire connection portions 72, 82, 92*a*, and 92*b* and the arrangement of the mounting portions 76, 86, and 96 in the terminals 70, 80, and 90 are shifted in the Y-axis direction when viewed from the Z-axis direction. In the present embodiment, the wire connection portions 72, 92*a*, 92*b*, and 82 are arranged in this order in the Y-axis direction at substantially equal intervals, and the embedded portions 74, 94, and 84 shown in FIG. 2 are embedded in an insulating material constituting the bobbin 20 so that the mounting portions 76, 96, and 86 are positioned at substantially equal intervals between the wire connection portions 72, 92*a*, 92*b*, and 82.

Note that, as shown in FIG. 5, the terminals 70, 90, and 80 are arranged in this order along the Y-axis direction in the terminal block 22, but the terminals 80, 90, and 70 are arranged in this order in the terminal block 23 to the contrary.

As shown in FIG. 2, the lower surfaces of the mounting portions 76, 86, and 96 protrude downward more than the lower surface of the bobbin 20 by a predetermined height Z2. The predetermined height Z2 is preferably larger than zero and is preferably about 0.5 to 2 times the thickness of the plate member constituting the mounting portions 76, 86, and 96.

In the present embodiment, as shown in FIG. 6, six mounting-side convex portions 28 are formed in total on the lower side of the bobbin 20, and the lower surfaces of the convex portions 28 are the lower surface of the bobbin 20. As shown in FIG. 4A, three mounting-side convex portions 28 are formed on the lower surface of each of the terminal blocks 22 and 23 at intervals in the Y-axis direction, lead communication grooves (conductive paths) 29 are formed between the three mounting-side convex portions 28. Moreover, side walls 28*a* are formed at both ends of the terminal blocks 22 and 23 in the Y-axis direction, and the lead communication grooves 29 are also formed between the side walls 28*a* and the lead communication grooves 28 adjacent to the side walls 28*a*.

The width Y1 of the lead communication grooves 29 in the Y-axis direction is preferably substantially equal to or larger than the width Y2 of the wire connection portions 74, 84, and 94, but may be smaller than the width Y2 of the wire connection portions 74, 84, and 94. Moreover, preferably, the positions of the wire connection portions 72 and 82 are shifted outward in the Y-axis direction from those of the mounting portions 76 and 86.

As shown in FIG. 4A, preferably, the outer end surfaces of the mounting-side convex portions 28 in the X-axis direction are arranged so as to be recessed from the outer end surface of the bobbin 20 in the X-axis direction by a predetermined interval X1. The predetermined interval X1 is determined with relation to, for example, the length X2 of the terminal blocks 22 and 23 in the X-axis direction. X1/X2 is preferably ½ or less and is more preferably ⅓ or less. X1/X2 may be zero, but is preferably ⅙ or more. The length X2 of each of the terminal blocks 22 and 23 is determined from, for example, the overall length X0 of the bobbin 20. Preferably, X2/X0 is 0.2 to 0.3. In the present embodiment, the overall length X0 of the bobbin 20 in the X-axis is larger than the overall length Y0 of the bobbin 20 in the Y-axis, but the opposite is possible.

In the present embodiment, as shown in FIG. 2, the mounting portions 76, 86, and 96 protrude outward in the X-axis direction more than the outer end surface of the bobbin 20 from the outer end surfaces of the mounting-side convex portions 28. In this configuration, the outer end surfaces of the mounting-side convex portions 28 reinforce the boundary portions between the mounting portions 76, 86, and 96 and the embedded portions 74, 84, and 94, and the mounting portions 76, 86, and 96 are easily mounted on a mounting surface such as a circuit board.

Figure 8:
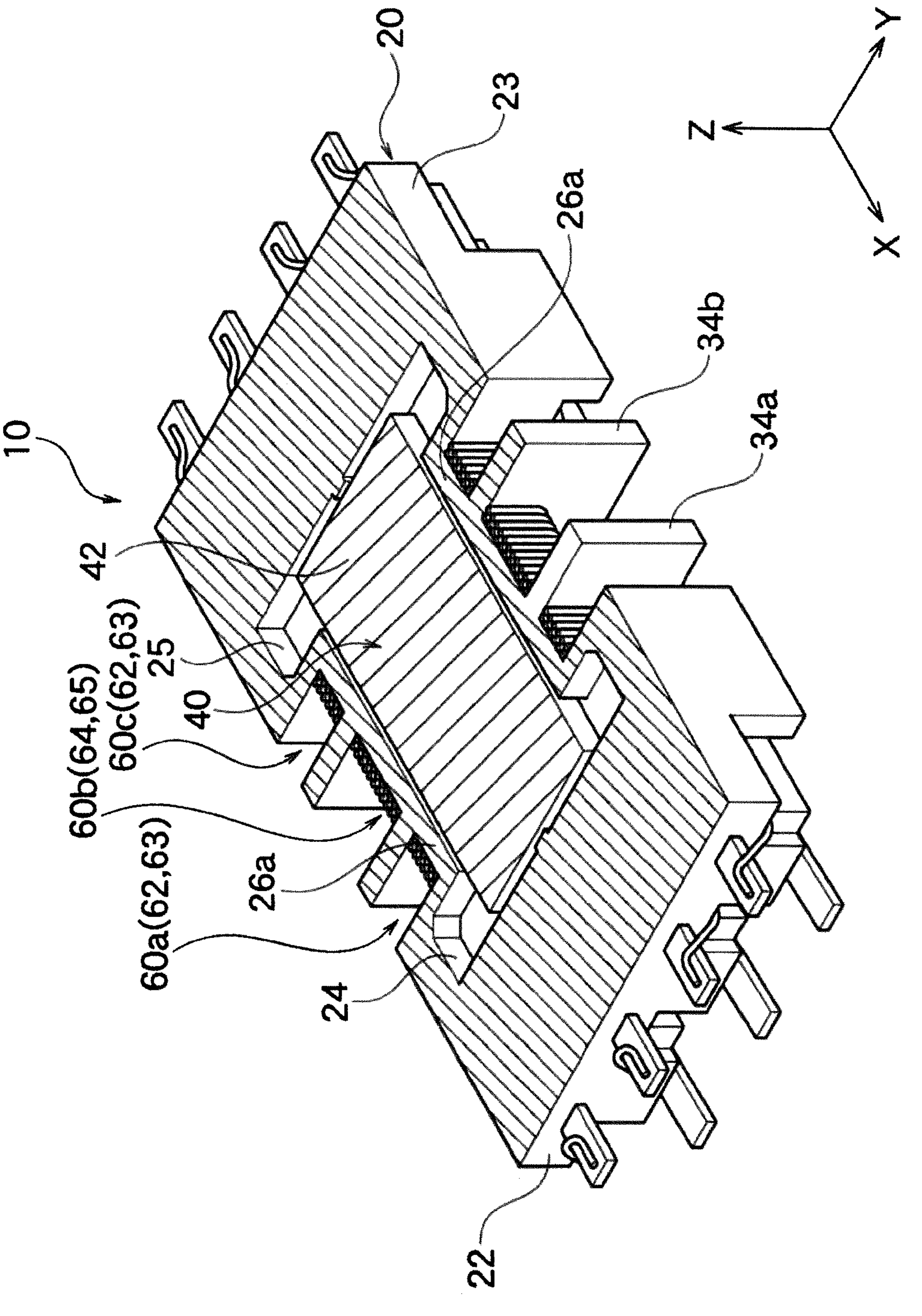
FIG. 8 is a perspective view including a cross section (S-Y cross section) parallel to the plane of the coil device shown in FIG. 1.

In the present embodiment, as shown in FIG. 8, slight gaps may be formed in the Y-axis direction between the connection side portions 26*a* and the winding core portion 42 in a state where the main core 40 and the winding core portion 42 are located between the pair of connection side portions 26*a* having a side wall shape. In this state, two wires 62 and 63 for constituting coils 60*a* and 60*c* described below and two wires 64 and 65 for constituting the coil 60*b* are wound from above the connection side portions 26*a* sandwiching the winding core portion 42 and the bottom wall 26*b* (see FIG. 10A) located on the lower surface of the winding core portion 42.

Preferably, the wires 62 to 65 are conductive wires (also referred to as insulated wires) having insulating coatings formed on their outer circumferential surfaces. Moreover, in the present embodiment, preferably, the insulating coatings have no pinholes. For example, polyurethane, ETFE, PFA, PET, polyamide, or PPS can be applied to the insulating coatings for the wires 62 to 65.

In the present embodiment, as shown in FIG. 2, the coil 60 includes a proximal first coil 60*a*, an intermediate second coil 60*b*, and a distal first coil 60*c* in order from the vicinity of the first terminal block 22. The proximal first coil 60*a* of the coil 60 is located closest (adjacent) to the first terminal block 22. The intermediate second coil 60*b* is located second closest to the first terminal block 22 after the proximal first coil 60*a*. The distal first coil 60*c* is located farther from the first terminal block 22 than the proximal first coil 60*a* and the intermediate second coil 60*b* and is adjacent to the second terminal block 23.

The proximal first coil 60*a* and the intermediate second coil 60*b* are separated and insulated by the first bobbin flange portion 34*a*. The intermediate second coil 60*b* and the distal first coil 60*c* are separated and insulated by the second bobbin flange portion 34*b*.

Figure 10A:
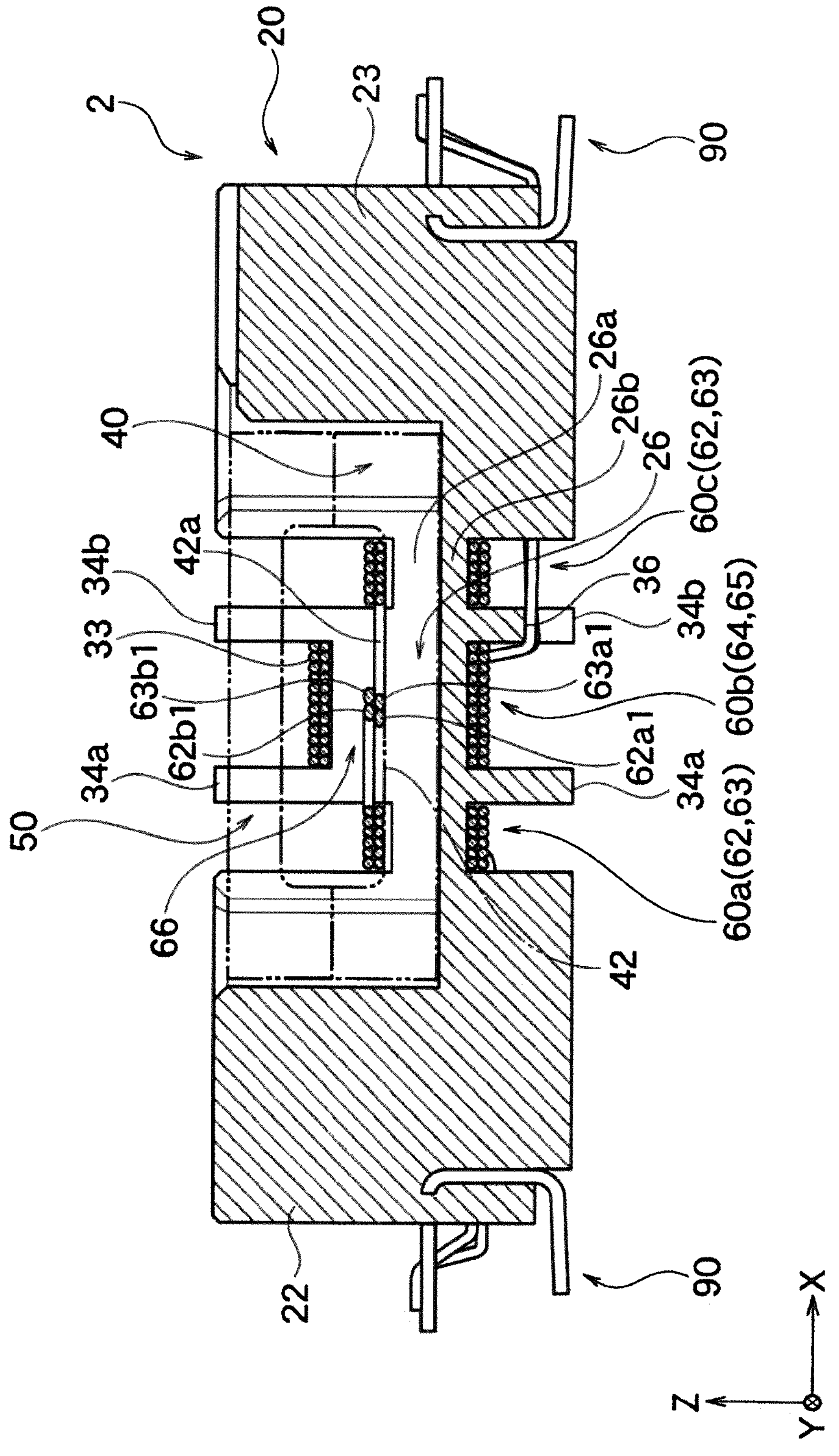
FIG. 10A is a vertical cross section of the coil device shown in FIG. 1.

As shown in FIG. 10A, the proximal first coil 60*a* and the distal first coil 60*c* are continuously formed by one or more wires, such as two first wires 62 and 63. The proximal first coil 60*a* and the distal first coil 60*c* are formed by winding the first wires 62 and 63 from above the winding core portion 42, the connection side portions 26*a*, and the bottom wall 26*b*. This winding operation is preferably performed automatically, but may be performed manually.

Figure 9:
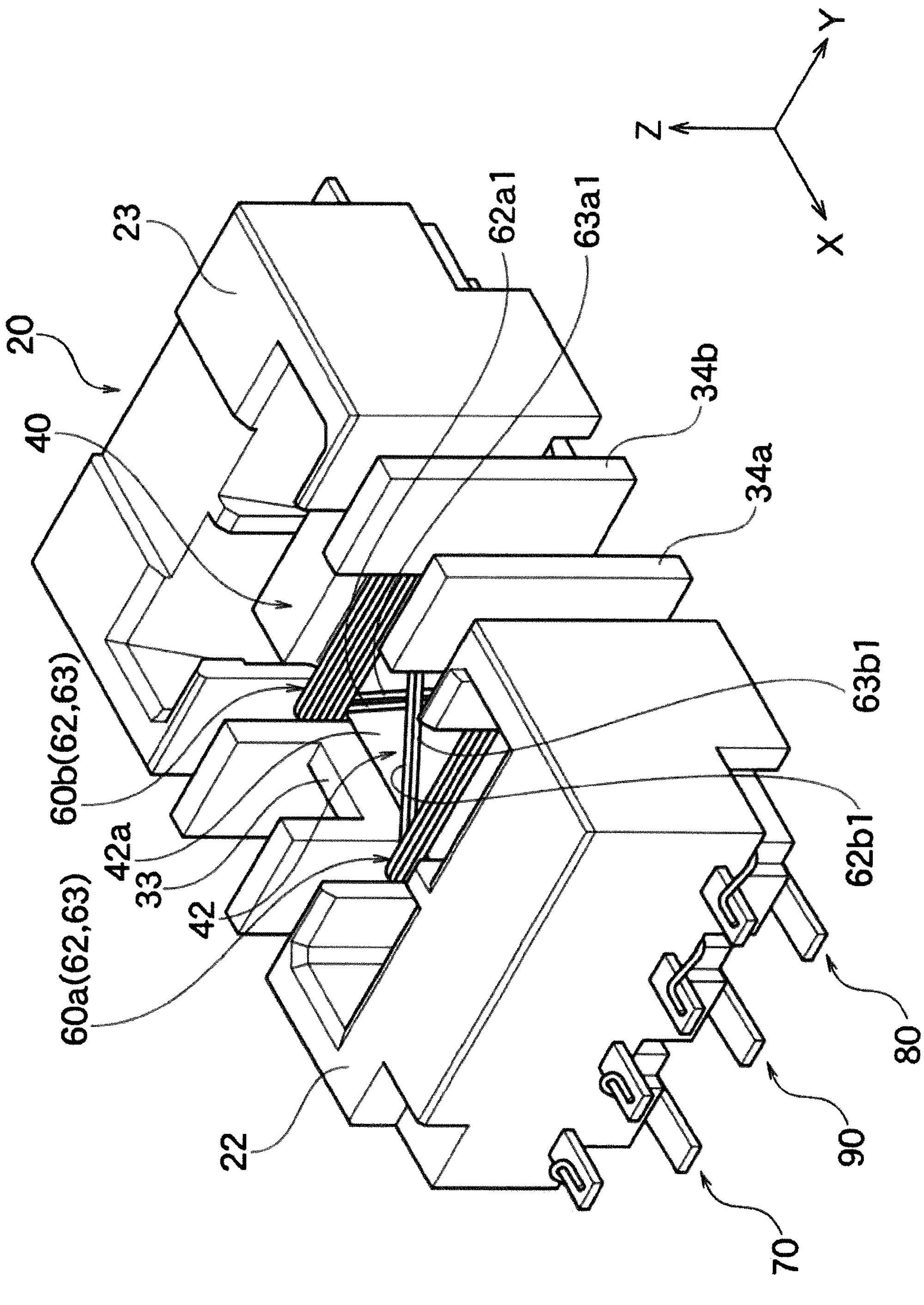
FIG. 9 is a perspective view of the coil device shown in FIG. 1 viewed from another angle.

The proximal first coil 60*a* and the distal first coil 60*c* are continuously connected by communication wire portions 62*a*1, 62*b*1, 63*a*1, and 63*b*1 of the first wires 62 and 63. As shown in FIG. 9, the communication wire portions 62*a*1 and 63*a*1 and the communication wire portions 62*b*1 and 63*b*1 intersect in the vicinity of the center of the upper surface 42*a* of the winding core portion 42. The pair of communication wires 62*a*1 and 63*a*1, which is either one of the pairs, is a communication wire for departure from the proximal first coil 60*a* to the distal first coil 60*c*, and the pair of communication wires 62*b*1 and 63*b*1, which is the other pair, is a communication wire for return.

In the vicinity of the center of the upper surface 42*a* of the winding core portion 42, as shown in FIG. 10A, the communication wire portions 62*b*1 and 63*b*1 overlap the communication wire portions 62*a*1 and 63*a*1. The communication wire portions 62*a*1, 62*b*1, 63*a*1, and 63*b*1 are arranged between a portion where the second wires 64 and 65 mentioned below pass through the raised portion 33 and are wired in the air and the upper surface 42*a* of the winding core portion 42. The first wires 62 and 63 including the communication wire portions 62*a*1, 62*b*1, 63*a*1, and 63*b*1 are preferably contacted with the upper surface 42*a* of the winding core portion 42, but may have a gap.

As shown in FIG. 4A, one end of the first wire 62 (one of the first wires 62 and 63) constituting the coils 60*a* and 60*c* passes through the lead communication groove 29 located at one end of the terminal block 22 in the Y-axis direction as a leading portion 62*a* and is introduced to the wire connection portion 72, and the other end of the first wire 62 passes through another lead communication groove 29 of the terminal block 22 as a leading portion 62*b* and is introduced to the wire connection portion 92*b*.

One end of the first wire 63 (the other of the first wires 62 and 63) constituting the coils 60*a* and 60*c* passes through the lead communication groove 29 of the terminal block 22 as a leading portion 63*a* and is introduced to the wire connection portion 92*a*, and the other end of the first wire 63 passes through the lead communication groove 29 of the terminal block 22 as a leading portion 63*b* and is introduced to the wire connection portion 82.

In order to form the coils 60*a* and 60*c*, for example, the wires 62 and 63 are passed through the lead communication grooves 29 in a state where the leading portions 62*a* and 63*a* of the two first wires 62 and 63 are entwined with the wire connection portions 72 and 92*a* and fixed temporarily. Next, the wires 62 and 63 are wound around the upper surface of the winding core portion 42 and the connection side portions 26*a* and the bottom surface 26*b* of the bobbin 20 between the first terminal block 22 and the first bobbin flange portion 34*a*.

Moreover, the first wires 62 and 63 (communication wire portions 62*a*1 and 63*a*1) are pulled out between the second bobbin flange portion 34*b* and the second terminal block 23 along the upper surface 42*a* of the winding core portion 42. Next, the wires 62 and 63 are wound around the upper surface of the winding core portion 42 and the connection side portions 26*a* and the bottom surface 26*b* of the bobbin 20 between the second terminal block 23 and the second bobbin flange portion 34*b*.

Moreover, the first wires 62 and 63 (communication wire portions 62*b*1 and 63*b*1) are returned between the first bobbin flange portion 34*a* and the first terminal block 22 along the upper surface 42*a* of the winding core portion 42. If necessary, the wires 62 and 63 are wound around the upper surface of the winding core 42 and the connection side portions 26*a* and the bottom surface 26*b* of the bobbin 20 between the first bobbin flange portion 34*a* and the first terminal block 22, but are not necessarily wound. Moreover, the first wires 62 and 63 are passed through the respective lead communication grooves 29, and the lead portions 62*b* and 63*b* of the first wires 62 and 63 after forming the coils 60*a*, 60*c* are entwined with the wire connection portions 92*b* and 82, respectively. Accordingly, the coils 60*a* and 60*c* can be formed.

Note that, the leading portions 62*a*, 63*a*, 62*b*, and 63*b* of the wires 62 and 63 are only entwined with the respective wire connection portions 72, 92*a*, 92*b*, and 82, but connection portions 100 may be formed at the tips of the leading portions 62*a*, 63*a*, 62*b*, and 63*b* by a method such as laser welding. As a result, the leading portions 62*a*, 63*a*, 62*b*, and 63*b* and the wire connection portions 72, 92*a*, 92*b*, and 82 can be electrically connected and fixed. The connection portions 100 can be electrically connected by irradiating the leading portions 62*a*, 63*a*, 62*b*, and 63*b* and the wire connection portions 72, 92*a*, 92*b*, and 82 with a laser beam. Note that, in addition to laser welding, the connection portions 100 can be formed by solder bonding, bonding with a conductive adhesive, heat fusion bonding, resistance welding, or the like.

As shown in FIG. 10A, the intermediate second coil 60*b* is formed by two second wires 64 and 65. The intermediate second coil 60*b* is formed by winding the second wires 64 and 65 around the outer surface of the bottom wall 26*b* and the side surfaces of the pair of connection side portions 26*a* of the bobbin 20 and the upper end of the raised portion 33 between the flange portions 34*a* and 34*b*. This winding operation is preferably performed automatically, but may be performed manually.

As shown in FIG. 4A, one end of the second wire 64 (one of the second wires 64 and 65) constituting the intermediate second coil 60*b* passes through the lead communication groove 29 located at one end of the second terminal block 23 in the Y-axis direction as a leading portion 64*a* and is introduced to the wire connection portion 72, and the other end of the second wire 64 passes through another lead communication groove 29 as a leading portion 64*b* and is introduced to the wire connection portion 92*b* attached to the terminal block 23.

One end of the second wire 65 (the other of the second wires 64 and 65) constituting the intermediate second coil 60*b* passes through another lead communication groove 29 of the terminal block 23 as a leading portion 65*a* and is introduced to the wire connection portion 92*a*, and the other end of the second wire 65 passes through further another lead communication groove 29 of the terminal block 23 as a leading portion 65*b* and is introduced to the wire connection portion 82.

As shown in FIG. 10A, the second wires 64 and 65 of the intermediate second coil 60*b* are bridged between the pair of raised portions 33 and wired in the air, and the wiring space 66 is formed between the upper surface 42*a* of the winding core portion 42 and this wiring in the air. The communication portions 62*a*1, 63*a*1, 62*b*1, and 63*b*1 of the first wires 62 and 63 mentioned above connect the proximal first coil 60*a* and the distal first coil 60*b* via the wiring space 66.

The coil 60*b* is formed by winding one or more wires, such as two second wires 64 and 65, around the outer circumference of the bobbin 20 including the raised portions 33 between the first bobbin flange portion 34*a* and the second bobbin flange portion 34*b*. In order to form the coil 60*b*, first of all, the leading portions 64*a* and 65*a* of the two second wires 64 and 65 are passed through the respective lead communication grooves 29 and guided between the first bobbin flange portion 34*a* and the second bobbin flange portion 34*b* while being entwined with the wire connection portions 72 and 92*a* and fixed temporarily.

After that, the two second wires 64 and 65 are wound around the outer circumference of the bobbin 20 including the raised portions 33 between the first bobbin flange portion 34*a* and the second bobbin flange portion 34*b*. After that, the leading portions 62*b* and 63*b* of the second wires 64 and 65 are passed through the respective lead communication grooves 29 and are entwined with the wire connection portions 78 and 92*b*. Accordingly, the coil 60*b* can be formed after the coils 60*a* and 60*c* are formed.

Note that, the leading portions 64*a*, 65*a*, 64*b*, and 65*b* of the wires 64 and 65 are only entwined with the respective wire connection portions 72, 92*a*, 92*b*, and 82, but the connection portions 100 may be formed at the tips of the leading portions 62*a*, 63*a*, 62*b*, and 63*b* by a similar method to the method of connecting the wires 62 and 63 mentioned above.

In the transformer 10 according to the present embodiment, the bobbin 20 does not cover the entire circumference of the winding core portion 42 of the main core 40, but covers only both sides of the winding core portion 42 in the Y-axis direction and the bottom surface of the winding core portion 42, and the bobbin 20 does not cover the upper surface of the winding core portion 42. In the present embodiment, preferably, as shown in FIG. 7, the thickness (Z-axis direction) of the bottom wall 26*b* of the bobbin 20 is smaller than the thickness (Y-axis direction) of the connection side portions 26*a*. This is because the distance between the wires 62 to 65 and the winding core portion 42 can be reduced by the bottom wall 26*b* of the bobbin 20.

Note that, the bottom wall 26*b* of the bobbin is not necessarily formed, and the winding core portion 42 may be interposed between the pair of connection side portions 26*a*. In that case, the wires 62 to 65 and the bottom surface of the winding core portion 42 may be contacted with each other, and the distance between them can be further reduced.

In the present embodiment, the height of the bobbin 20 is reduced, and the height of the transformer 10 can also consequently be reduced. In the present embodiment, the overall height Z0 (see FIG. 2) of the coil device 10 can be reduced to preferably 6 mm or less, more preferably 4.5 mm or less.

Moreover, since the core flange portions 44 of the main core 42 are accommodated in the flange accommodation recesses 24 and 25 of the terminal blocks 22 and 23 and the lower surface of the winding core portion 42 in the Z-axis and both side surfaces of the winding core portion 42 in the Y-axis are integrally covered with the bottom wall 26*b* and the connection side portions 26*a*, the withstand voltage is also improved. Moreover, in the present embodiment, the shortest distance (insulation distance or creepage distance) between the main core 40 and the terminal 70, 80, or 90 can be determined sufficiently large (e.g., 5 mm or more), and the insulating property is thus excellent.

Moreover, since the wires 62 to 65 have a portion that is also contacted with the surface of the main core 40, the wires 62 to 65 can be insulated from the core 40 by forming insulating coatings, and a conductive core, such as a metal core, can be used as the main core 40.

Moreover, in the present embodiment, the wire connection portions 72, 82, 92*a*, and 92*b* and the mounting portions 76, 86, and 96 are positionally displaced from each other when viewed from the Z-axis direction and are arranged so as to protrude outward in the X-axis direction from the terminal blocks 22 and 23. In such a configuration, the wires 62 to 65 are easily connected, and the transformer 10 is also easily mounted. Moreover, the terminals 70, 80, and 90 can be easily integrally formed with the bobbin 20.

Moreover, in the present embodiment, the pair of terminal blocks 22 and 23 is integrally formed with the pair of connection side portions 26*a*, and the bobbin 20 further includes the bottom wall 26*b* integrating the pair of connection side portions 26*a* and 26*a* and covering the lower surface of the winding core portion 42. Moreover, in the present embodiment, the wires 62 to 65 are continuously wound so as to contact with the pair of connection side portions 26*a* and 26*a*, the bottom wall 26*b*, and the upper surface of the winding core portion 42. In such a configuration, the withstand voltage is improved.

Moreover, in the present embodiment, the main core 40 includes a pair of core flange portions 44 provided at both ends along the winding axis of the winding core portion 42. The openings of the flange accommodation recesses 24 and 25 of the terminal blocks 22 and 23 are formed with bonding recesses 30 capable of storing an adhesive on flange wing portions 46 of the core flange portions 44 in a state where the core flange portions 44 are accommodated in the flange accommodation recesses 24 and 25. The main core 40 and the bobbin 20 are easily fixed only by pouring an adhesive into the bonding recesses 30. Moreover, the main core 40 and the bobbin 20 are easily positioned, and it is possible to reduce variations in characteristics. Moreover, an adhesive fixation with the sub-core 50 can also be performed at the same time.

Moreover, since the terminal blocks 22 and 23 are formed with the notches 27 into which the boundary portions between the winding core portion 42 and the core flange portions 44 are inserted, the main core 40 is easily attached and positioned to the bobbin 20, and workability is improved. In addition, since both ends of the sub-core 50 different from the main core 40 are inserted into the upper portions of the notches 27, the sub-core 50, the main core 40, and the bobbin 20 are easily positioned and attached. Note that, the sub-core 50 is not necessarily composed of a magnetic material. In that case, the sub-core 50 can function, for example, as a suction portion of a suction nozzle for moving a transformer when the transformer is mounted.

Moreover, as shown in FIG. 4A, the lead communication grooves 29 as conductive paths for the leading portions 62*a* to 65*b* of the wires 62 to 65 passing and going to the wire connection portions 72, 82, 92*a*, and 92*b* of the terminals 70, 80, and 90 are formed on the bottom surfaces of the terminal blocks 22 and 23 located on the opposite side to the openings of the flange accommodation recesses 24 and 25 in the Z-axis direction. In such a configuration, the wires 62 to 65 are easily connected, and the insulation between the leading portions 62*a* to 65*b* and the main core 40 is also improved.

In the coil device 10 of the present embodiment, the intermediate second coil 60*b* is disposed so as to be sandwiched between the proximal first coil 60*a* and the distal first coil 60*c* along the core axis (parallel to the X-axis) of the winding core portion 42 of the core 40. In addition, the proximal first coil 60*a* and the distal first coil 60*c* are continuously formed by the first wires 62 and 64 consisting of one or more wires.

Thus, for example, when the intermediate second coil 60*c* functions as a secondary coil and the proximal first coil 60*a* and the distal first coil 60*c* function as a primary coil, the coupling between the primary coil and the secondary coil can be improved. Thus, the coils can be favorably used for transformers such as pulse transformers. Note that, this is also the case even if the primary coil and the secondary coil are reversed.

As shown in FIG. 10A, since the connection portion 26 of the bobbin 20 includes the raised portions 33, the wiring space 66 can be formed between the second wires 64 and 65 wound in contact with the upper end (tip) of the raised portions 33 and the outer surface of the winding core portion 42. The wiring space 66 is partially (preferably, at one or more places) formed inside along the circumferential direction of the intermediate second coil 60*b*.

The first wires (communication wire portions 62*a*1, 63*a*1, 62*b*1, and 63*b*1) 62 and 63 are passed between the proximal first coil 60*a* and the distal first coil 60*c* via the wiring space 66, and the first wires constituting the proximal first coil 60*a* and the distal first coil 60*c* become continuous. Thus, the first wires 62 and 63 and the second wires 64 and 65 can be insulated favorably.

Moreover, in the present embodiment, the wiring space 66 is formed at one place inside the intermediate second coil 60*b*, and the radial winding position of the second wires 64 and 65 constituting the intermediate second coil 60*b* is substantially the same as the radial winding position of the first wires 62 and 63 constituting the proximal first coil 60*a* and the distal first coil 60*c* in a portion other than the wiring space 66 formed by the raised portions 33. In such a configuration, the coupling of these coils is improved.

Moreover, in the coil device 10 of the present embodiment, since the bobbin flange portions 34*a* and 34*b* are arranged between the proximal first coil 60*a* and the intermediate second coil 60*b* and between the intermediate second coil 60*b* and the distal first coil 60*c*, respectively, the insulation between the coils 60*a*, 60*b*, and 60*c* is favorably secured. Thus, compared to a coil device such as a transformer where a primary coil and a secondary coil are wound in layers, high performance insulation properties of the insulation coating of the wire itself are not required, which contributes to wider selection of wires and cost reduction.

In the coil device 10 of the present embodiment, compared to a coil device such as a transformer where a primary coil and a secondary coil are wound in layers, the winding outer diameter of the wire can be reduced, and the height of the coil device 10 can be reduced.

Moreover, in the coil device 10 of the present embodiment, as shown in FIG. 4A, the second bobbin flange portion 34*b* includes the guide grooves 36 for guiding the leading portions 64*a*, 64*b*, 65*a*, and 65*b* of the second wires 64 and 65 wound in the second intermediate coil 60*b* towards the second terminal block 23. The leading portions 64*a*, 64*b*, 65*a*, and 65*b* of the second wires 64 and 65 guided via the guide grooves 36 are wired in the air above the distal first coil 60*c*, go to the second terminal block 23, and connect to each of the wire connection portions 72, 82, and 92 of the terminals 70, 80, and 90.

In such a configuration, the leading portions 64*a*, 64*b*, 65*a*, and 65*b* of the second wires 64 and 65 from the intermediate second coil 60*b* can be connected to the terminals 70, 80, and 90 of the second terminal block 23 with a favorable insulation from the distal first coil 60*c*.

As shown in FIG. 10A, the guide grooves 36 are recessed from the outer circumferential edge of the second bobbin flange portion 34*b* at a different position (opposite position) from the raised portions 33 along the circumferential direction. The raised portions 33 are formed at the upper ends of the connection side portions 26*a* located on the anti-mounting surface side, and the guide grooves 36 are formed in the bobbin flange portion 34*b* located on the mounting surface side.

In such an arrangement, as shown in FIG. 4A, it is easy to insulate the leading portions 64*a*, 64*b*, 65*a*, and 65*b* of the second wires 64 and 65 from the intermediate second coil 60*b* and the leading portions 62*a*, 62*b*, 63*a*, and 63*b* of the first wires 62 and 63 from the proximal first coil 60*a*, and wiring is also easy. Moreover, as shown in FIG. 10A, the height of the wiring space 66 in the Z-axis direction can be increased with a low height of the coil device 10.

The raised portions 33 of the bobbin 20 protrude towards the anti-mounting surface. The raised portions 33 are a pair protruding from both sides of the bobbin 20 in the Y-axis towards the anti-mounting side. In such a configuration, the wiring space 66 is easily formed inside the intermediate second coil 60*b*. In addition, the winding operation of the wires 62 to 65 around the winding core portion 42 and the bobbin 20 becomes easy, and the winding operation is easily automated.

Moreover, the width of the wiring space 66 in the Y-axis direction is substantially the same as the width of the winding core portion 42 in the Y-axis direction and is sufficiently large. Thus, even in the case of bifilar winding, in which a wire is wound using two nozzles, the proximal first coil 60*a* and the distal first coil 60*c* can be easily communicated.

The first wires 62 and 63 are continuously wound so as to contact with the pair of connection side portions 26*a* and the bottom wall 26*b* and contact with the upper surface 42*a* of the winding core portion 42. In such a configuration, the coil device can be reduced in height and size, the wire winding operation becomes easy, and the inductance of the coil device is improved.

Second Embodiment

Figure 4B:
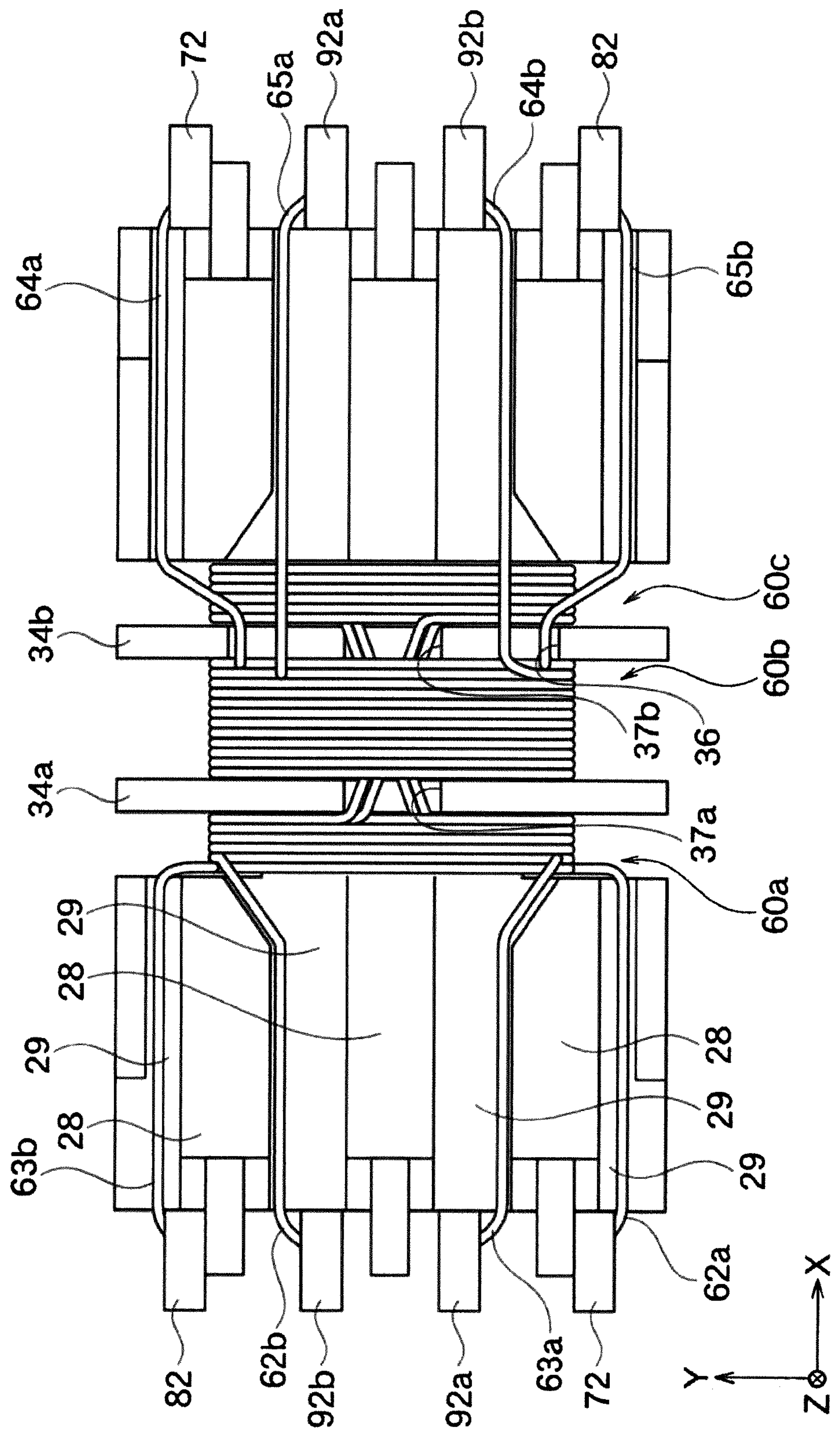
FIG. 4B is a bottom view of a coil device according to another embodiment of the present invention.
Figure 10B:
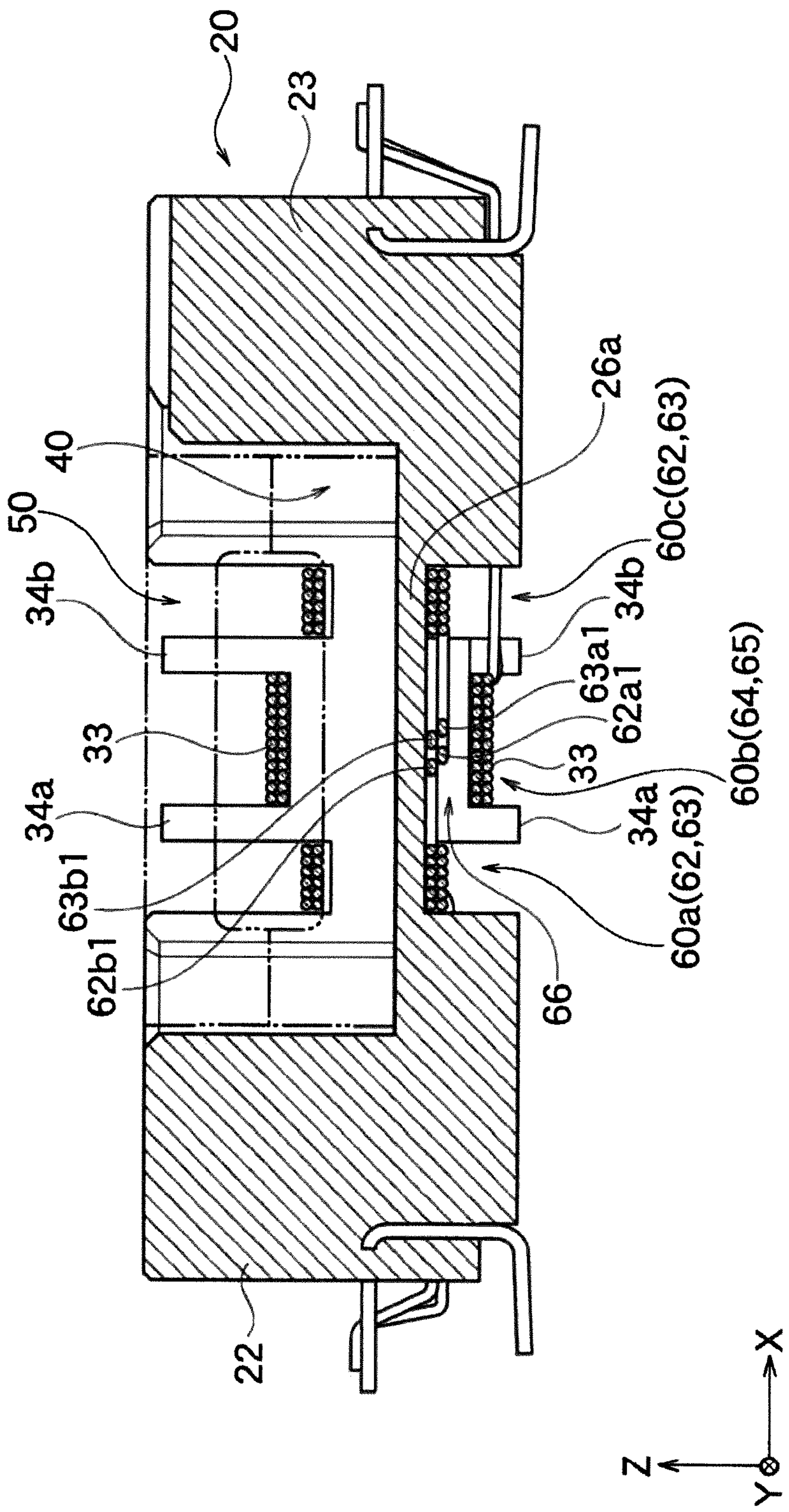
FIG. 10B is a vertical cross section of a coil device according to further another embodiment of the present invention.

Except for the structures of the bobbin 20 and the coils 60*a* to 60*c*, as shown in FIG. 4B and FIG. 10B, a transformer 10 as a coil device of the present embodiment has similar configurations and effects to those in First Embodiment. In the following description, overlapping respects are not described as much as possible, and different respects are mainly described. Common members in the figures are provided with common reference numerals.

In the bobbin 20 of the present embodiment, as shown in FIG. 10B, a pair of raised portions 33 protruding downward in the Z-axis (towards a mounting surface) is also formed on the mounting side of the connection side portions 26*a* located between the first bobbin flange portion 34*a* and the second bobbin flange portion 34*b*. That is, the raised portions 33 protrude upward and downward in the Z-axis direction with the bottom wall 26*b* interposed therebetween.

In the intermediate second coil 60*b*, the second wires 64 and 65 are bridged between the pair of raised portions 33 on the upper side of the core portion 42 in the Z-axis and are also wired in the air on the mounting side of the bottom wall 26*b* in the Z-axis. Also, on the mounting side, the position of the intermediate second coil 60*b* and the positions of the proximal first coil 60*a* and the distal first coil 60*c* are shifted in the Z-axis direction.

In the present embodiment, the wiring gap 66 is formed between the second wires 64 and 65 wound in contact with the lower ends (tips) of the raised portions 33 and the outer surface of the bottom wall 26*b* of the bobbin 20. As shown in FIG. 4B, the first bobbin flange portion 34*a* is formed with a guide groove 37*a* recessed inward along the Z-axis from the outer circumferential end. Moreover, the second bobbin flange portion 34*b* includes the guide grooves 36, and a guide groove 37*b* further recessed inward along the Z-axis is formed on the inner side of the guide grooves 36 in the Y-axis direction.

In the present embodiment, the communication wire portions 62*a*1, 62*b*1, 63*a*1, and 63*b*1 shown in FIG. 10B connect the first wires 62 and 63 constituting the proximal first coil 60*a* and the distal first coil 60*c* via the wiring space 66 on the mounting side from the guide grooves 37*a* and 37*b* shown in FIG. 4B.

Third Embodiment

Figure 10C:
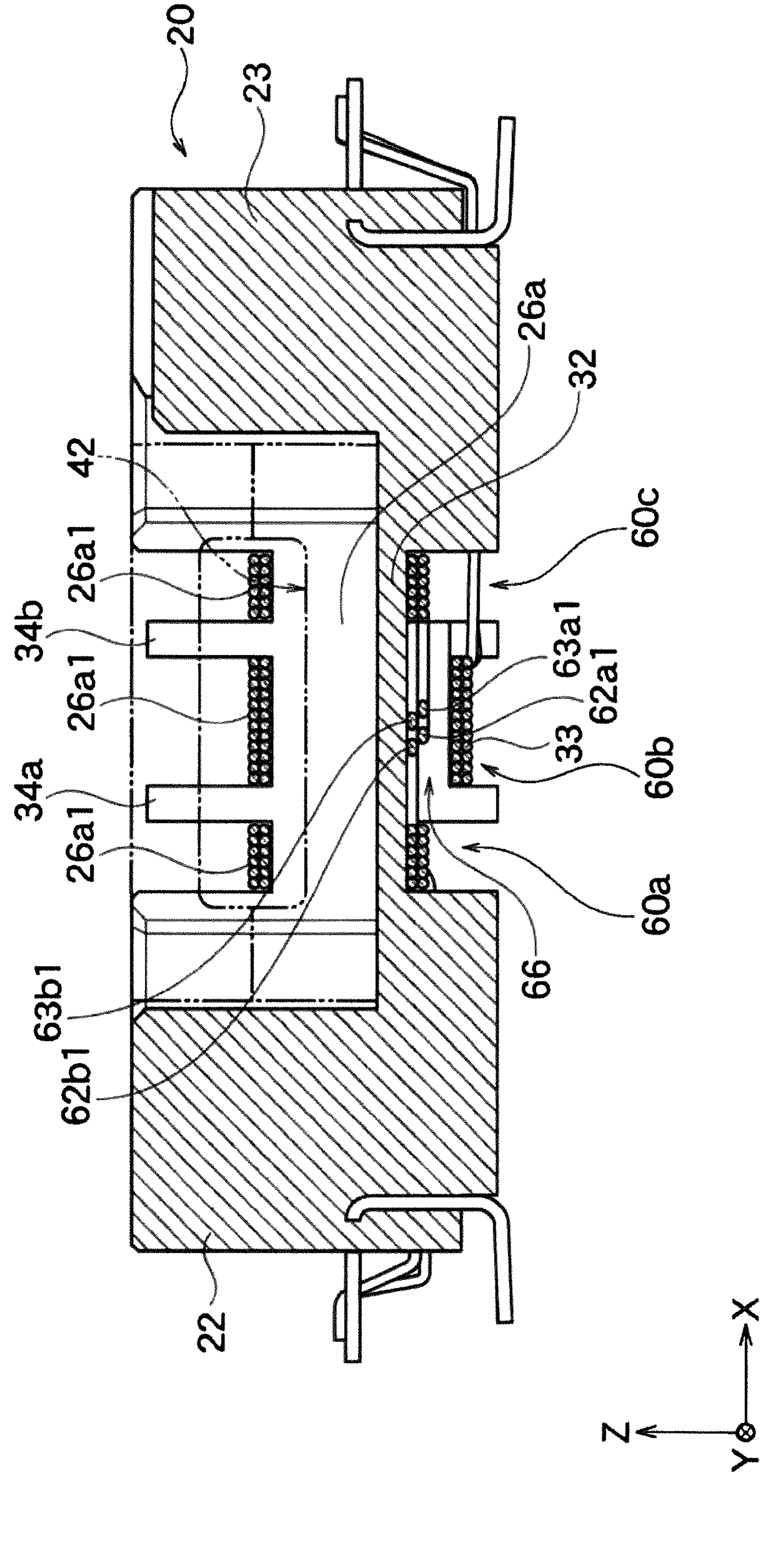
FIG. 10C is a vertical cross section of a coil device according to further another embodiment of the present invention.

Except for the structures of the bobbin 20 and the coils 60*a* to 60*c*, as shown in FIG. 10C, a transformer 10 as a coil device of the present embodiment has similar configurations and effects to those in First Embodiment or Second Embodiment. In the following description, overlapping respects are not described as much as possible, and different respects are mainly described. Common members in the figures are provided with common reference numerals.

In the present embodiment, all of upper ends 26*a*1 of the connection side portions 26*a* located between the first terminal block 22 and the first bobbin flange portion 34*a*, upper ends 26*a*1 of the connection side portions 26*a* located between the first bobbin flange portion 34*a* and the second bobbin flange portion 34*b*, and upper ends 26*a*1 of the connection side portions 26*a* located between the second terminal block 23 and the second bobbin flange portion 34*b* have substantially the same height in the Z-axis.

The upper ends 26*a*1 of the connection side portions 26*a* may have the same height in the Z-axis as the upper surface of the winding core portion 42, but are configured to be higher in the present embodiment as with the raised portions 33 mentioned in the above-mentioned embodiments. That is, all of the wires 62 to 65 passing through the upper ends 26*a*1 of the connection side portions 26*a* on the anti-mounting side are also wired in the air in the proximal first coil 60*a* and the distal first coil 60*c*.

Fourth Embodiment

Figure 10D:
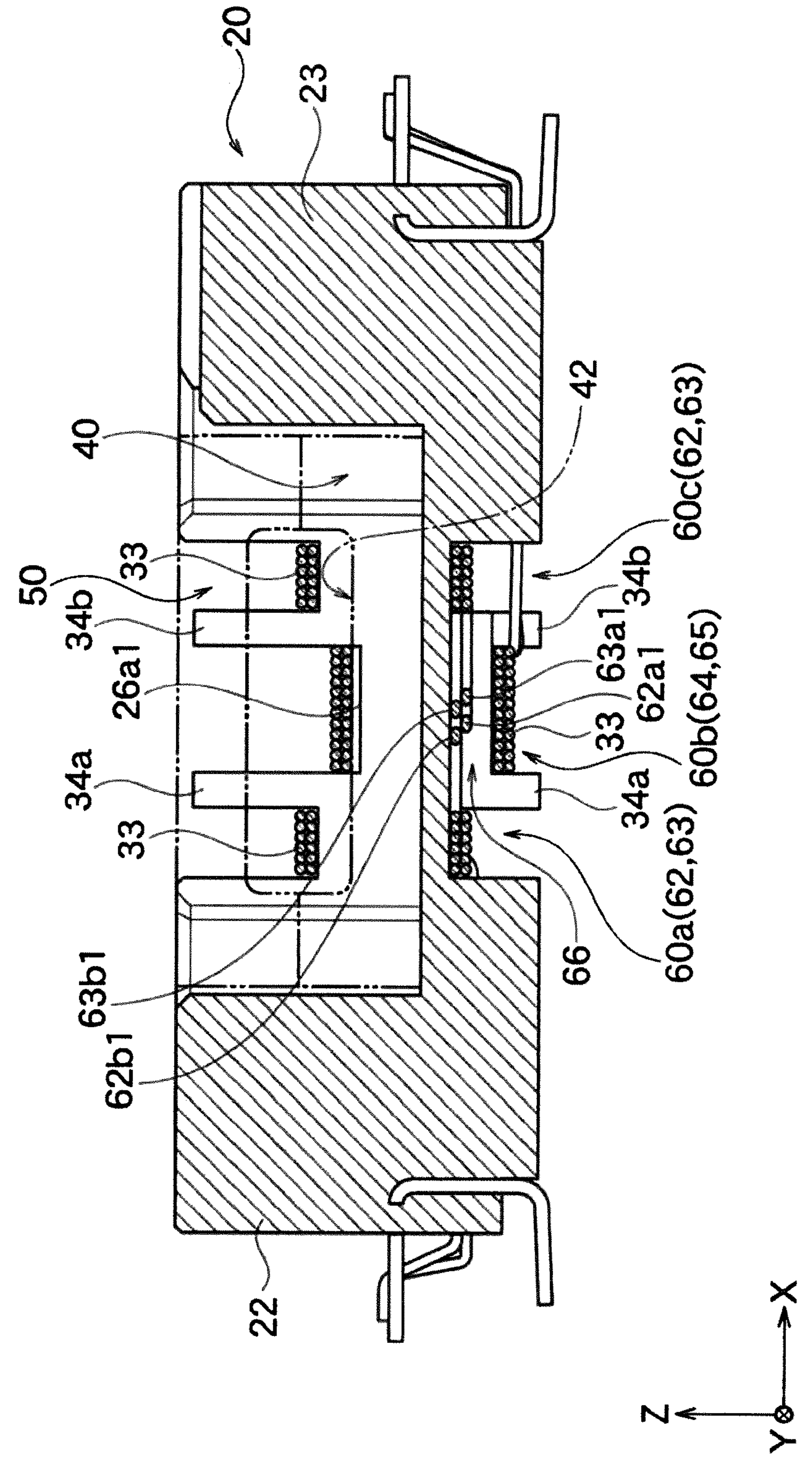
FIG. 10D is a vertical cross section of a coil device according to further another embodiment of the present invention.

Except for the structures of the bobbin 20 and the coil 60, as shown in FIG. 10D, a transformer 10 as a coil device of the present embodiment has similar configurations and effects to those in First to Third Embodiments. In the following description, overlapping respects are not described as much as possible, and different respects are mainly described. Common members in the figures are provided with common reference numerals.

In the present embodiment, the raised portions 33 are formed at the upper ends of the pair of connection side portions 26*a* on the anti-mounting side located between the first terminal block 22 and the first bobbin flange portion 34*a*. The raised portions 33 are also formed at the upper ends of the pair of connection side portions 26*a* on the anti-mounting side located between the second terminal block 23 and the second bobbin flange portion 34*b*. On the other hand, the upper ends 26*a*1 of the connection side portions 26*a* on the anti-mounting side located between the first bobbin flange portion 34*a* and the second bobbin flange portion 34*b* are formed with no raised portions and have substantially the same height in the Z-axis as the upper surface of the winding core portion 42.

Fifth Embodiment

Figure 11:
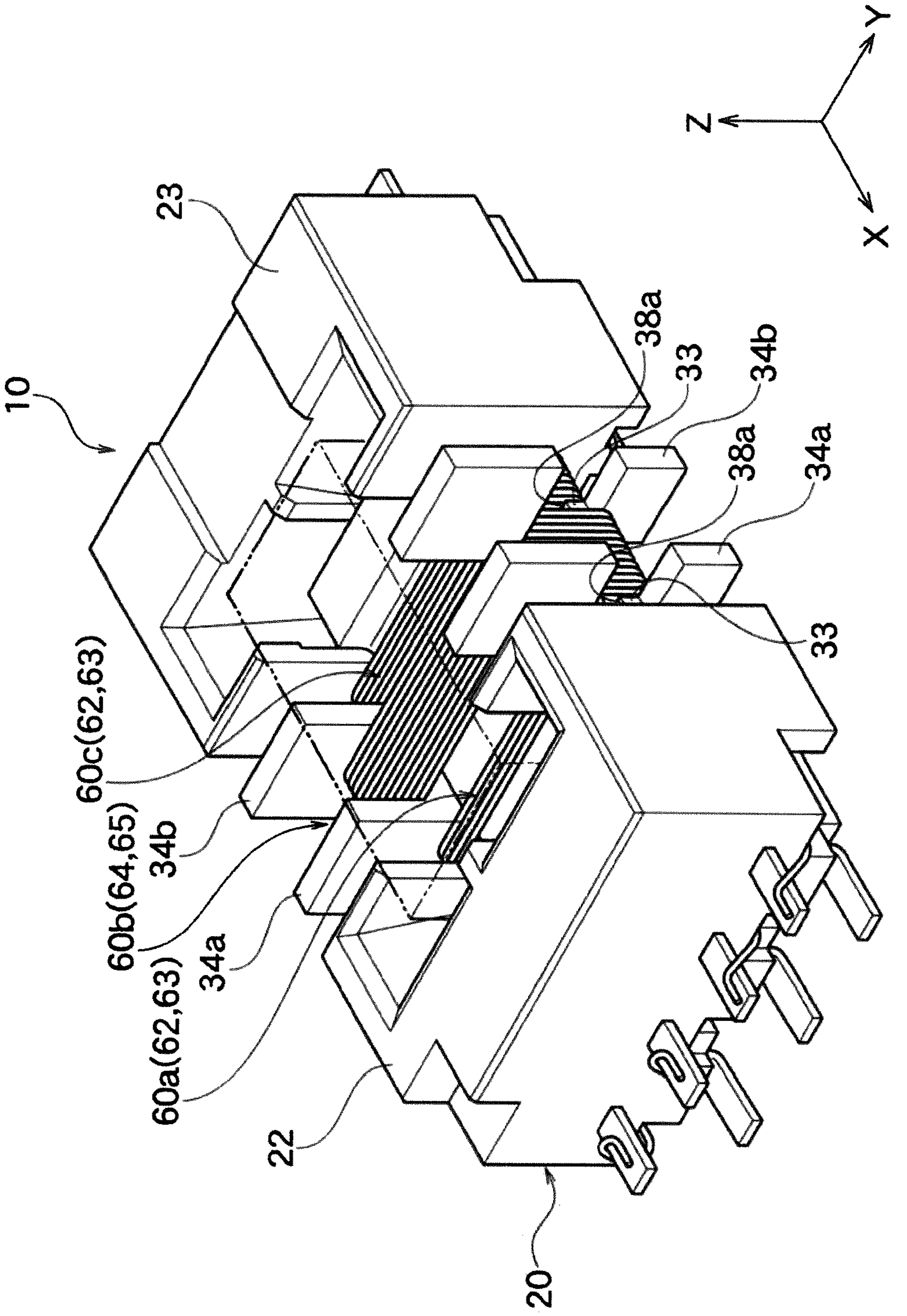
FIG. 11 is a cross-sectional perspective view of a coil device according to further another embodiment of the present invention.
Figure 12A:
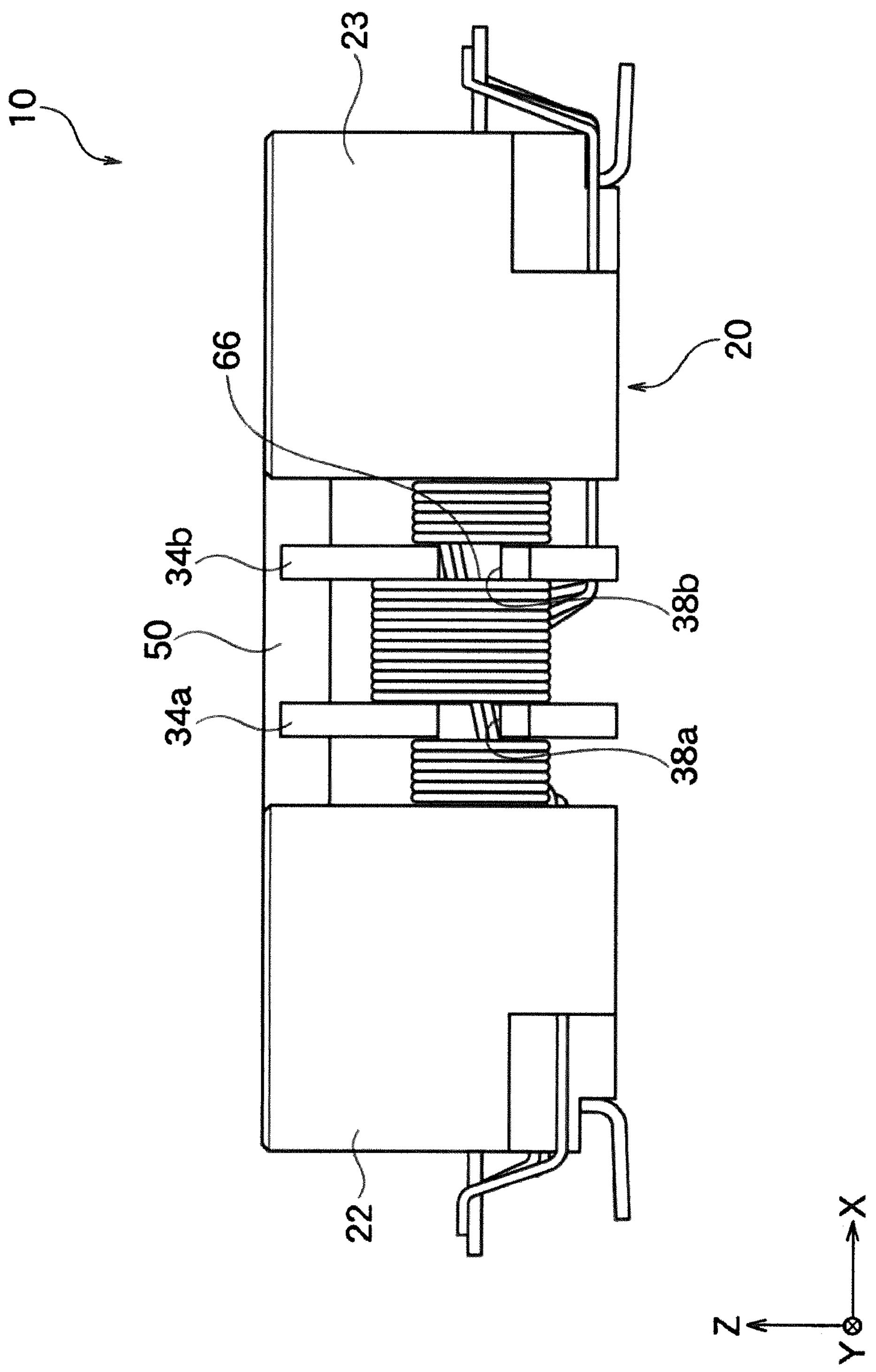
FIG. 12A is a side view of the coil device shown in FIG. 11.
Figure 12B:
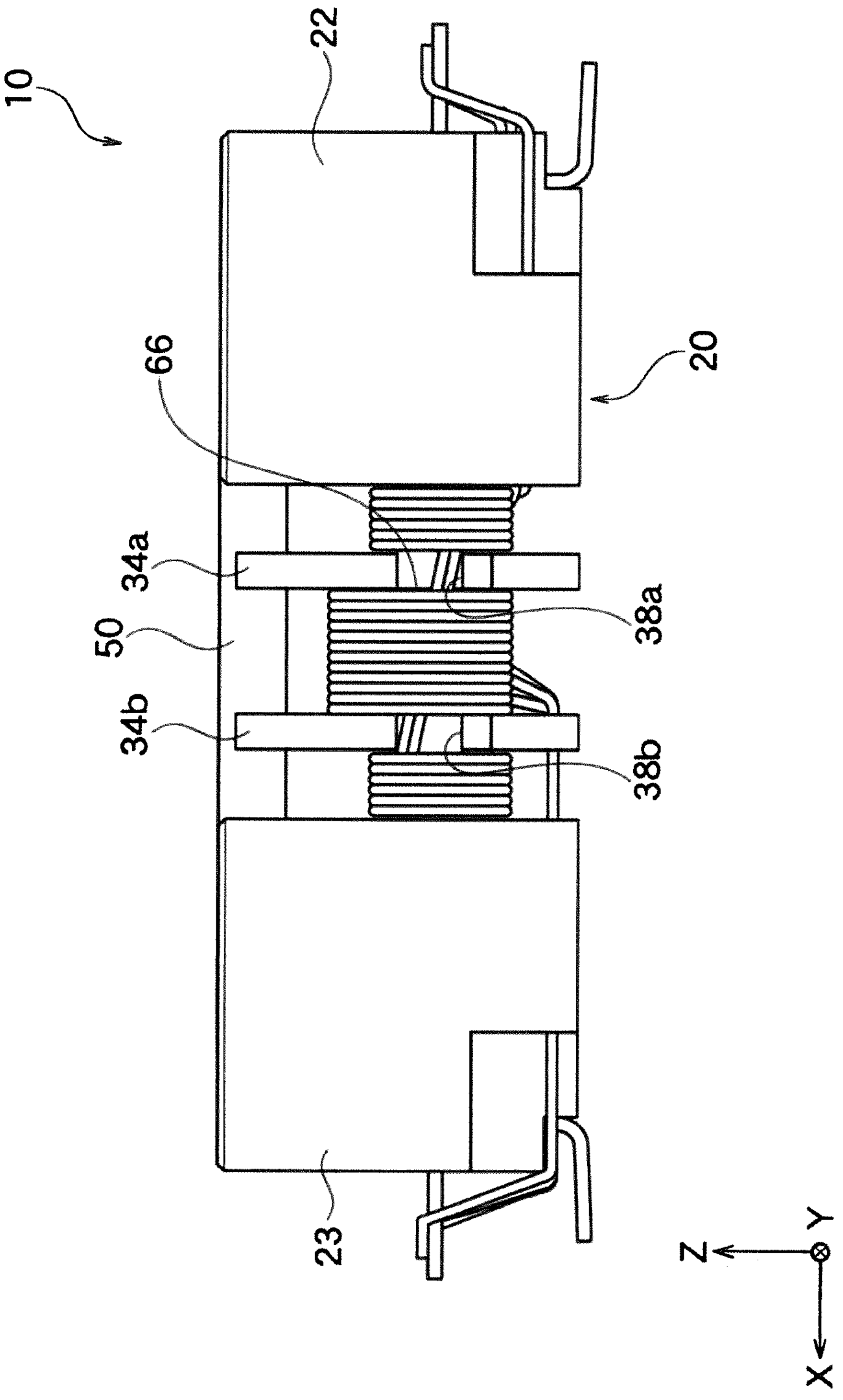
FIG. 12B is another side view of the coil device shown in FIG. 12A.
Figure 13:
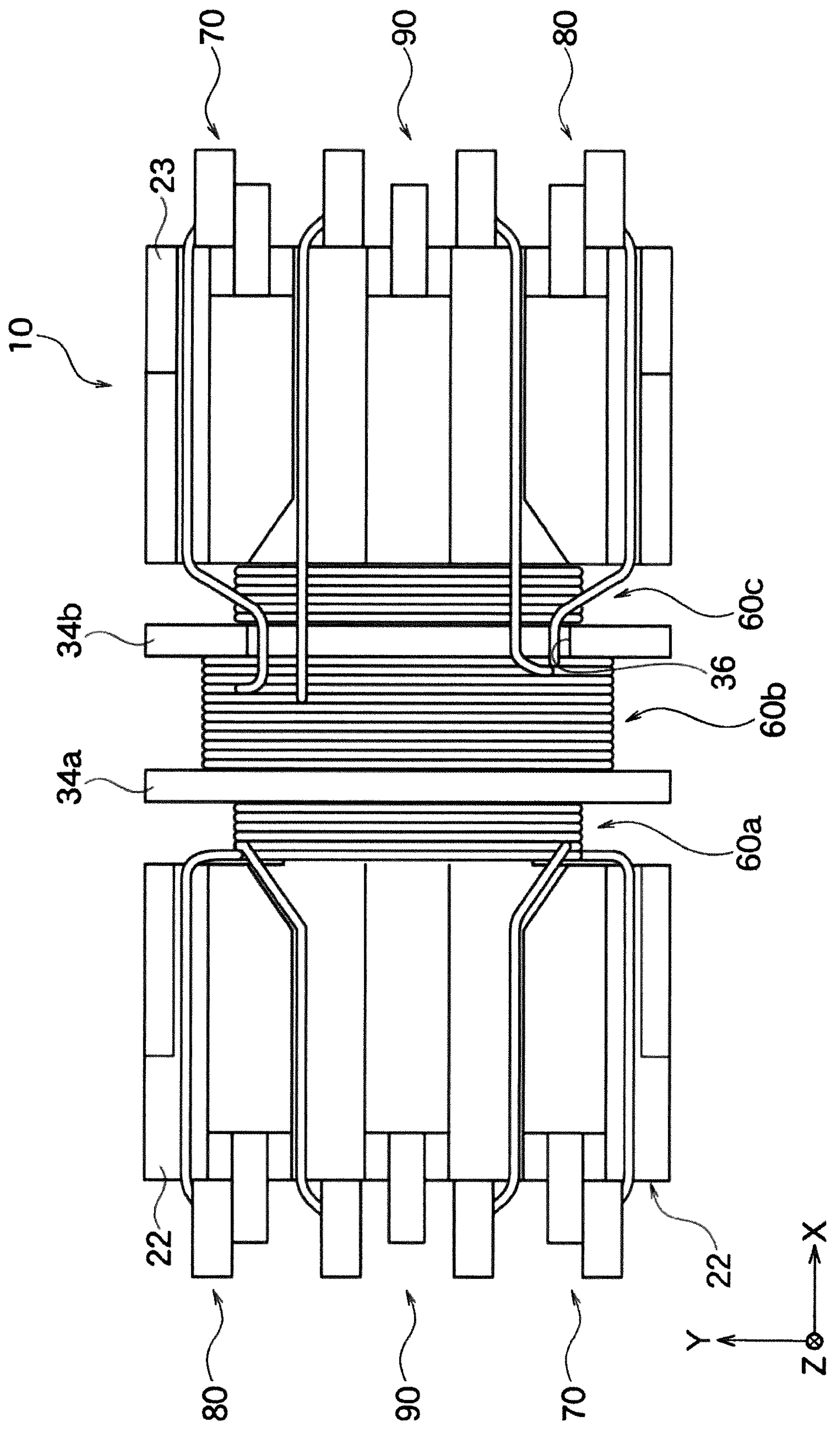
FIG. 13 is a bottom view of the coil device shown in FIG. 11.

Except for the structures of the bobbin 20 and the coils 60*a* to 60*c*, as shown in FIG. 11 to FIG. 13, a transformer 10 as a coil device of the present embodiment has similar configurations and effects to those in First to Fourth Embodiments. In the following description, overlapping respects are not described as much as possible, and different respects are mainly described. Common members in the figures are provided with common reference numerals.

As shown in FIGS. 12A and 12B, a pair of raised portions is formed at the connection side portions located between the first bobbin flange portion 34*a* and the second bobbin flange portion 34*b* so as to protrude outward in the Y-axis direction (direction parallel to a mounting surface). As a result, as shown in FIG. 13, both sides of the intermediate second coil 60*b* in the Y-axis are arranged on the outer side of both sides of the proximal first coil 60*a* and the distal first coil 60*c* in the Y-axis.

As shown in FIG. 12A and FIG. 12B, the first bobbin flange portion 34*a* and the second bobbin flange portion 34*b* are formed with guide grooves 38*a* and 38*b* recessed inward in the Y-axis from the outer circumferential edges. That is, in the intermediate second coil 60*b*, the wires are wound in the air between the pair of raised portions protruding outward in the Y-axis and separated in the Z-axis at a predetermined interval. The wiring spaced 66 is formed between the second wires 64 and 65 of the intermediate second coil 60*b* wired in the air and the outer surfaces of the connection side portions of the bobbin. The first wires 62 and 63 constituting the proximal first coil 60*a* and the distal first coil 60*c* are connected to each other via the wiring space 66.

Sixth Embodiment

Except for the structures of the bobbin 20 and the coils 60*a* to 60*d*, as shown in FIG. 14 to FIG. 17, a transformer 10 as a coil device of the present embodiment has similar configurations and effects to those in First to Fifth Embodiments. In the following description, overlapping respects are not described as much as possible, and different respects are mainly described. Common members in the figures are provided with common reference numerals.

Figure 14:
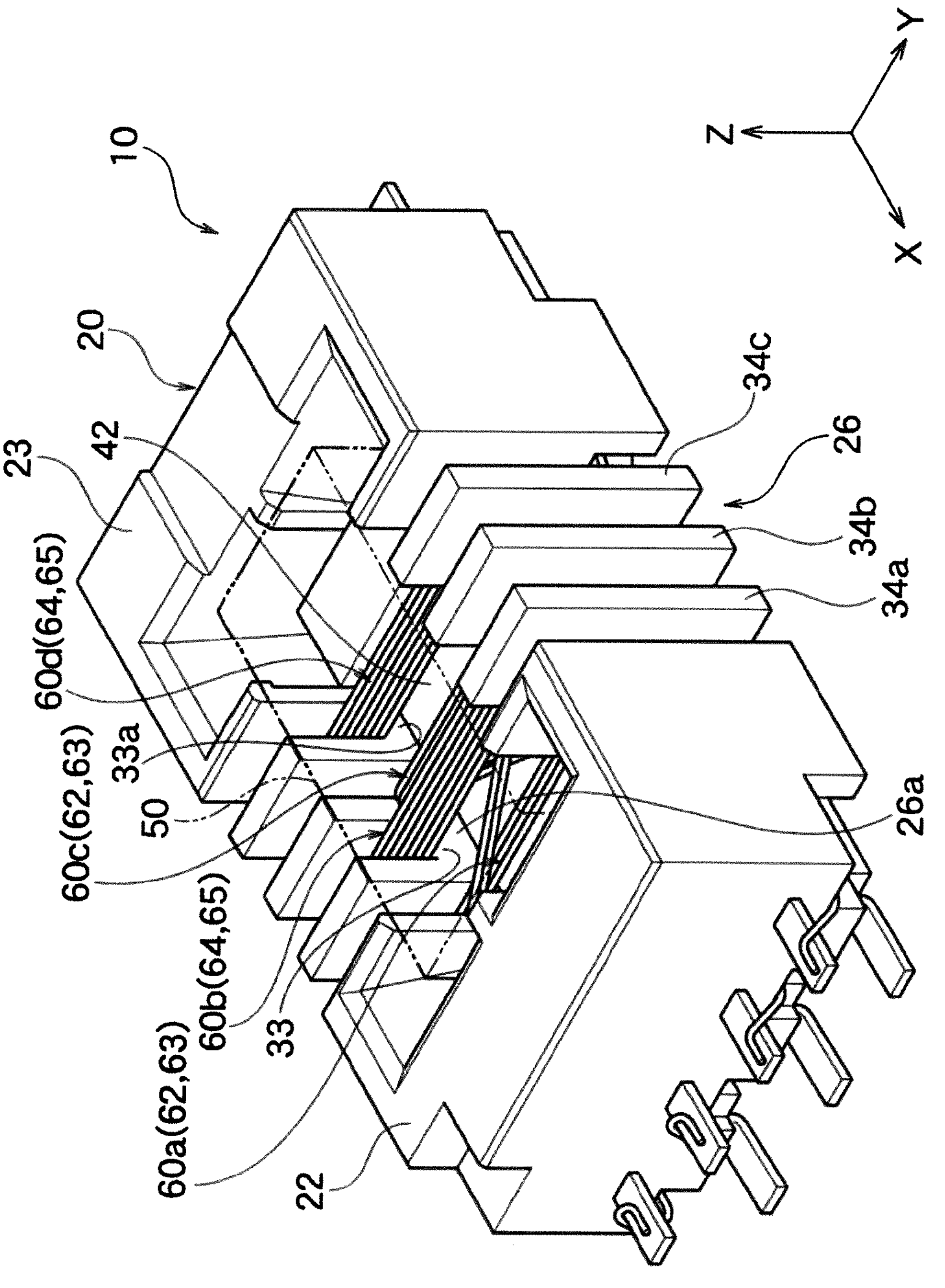
FIG. 14 is a perspective view of a coil device according to further another embodiment of the present invention.

In the present embodiment, as shown in FIG. 14, the connection portion 26 further includes a third bobbin flange portion 34*c*. That is, the third bobbin flange 34*c* is formed between the second bobbin flange portion 34*b* and the second terminal block 23. The second wires 64 and 65 are wound around the winding core portion 42 and the connection portion 26 located between the third bobbin flange portion 34*c* and the second bobbin flange portion 23 and constitute a distal second coil 60*d*.

Figure 15:
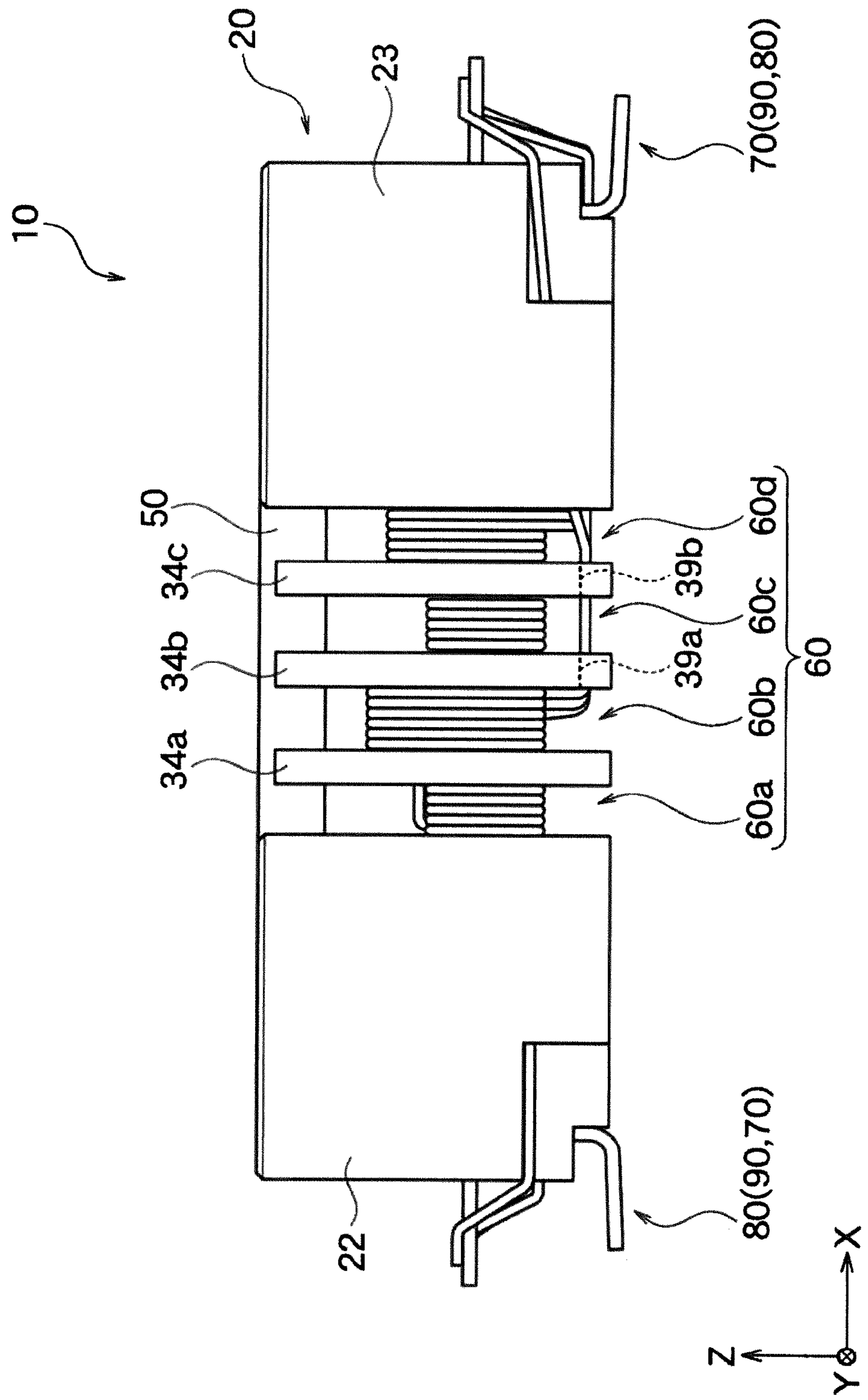
FIG. 15 is a side view of the coil device shown in FIG. 14.
Figure 16:
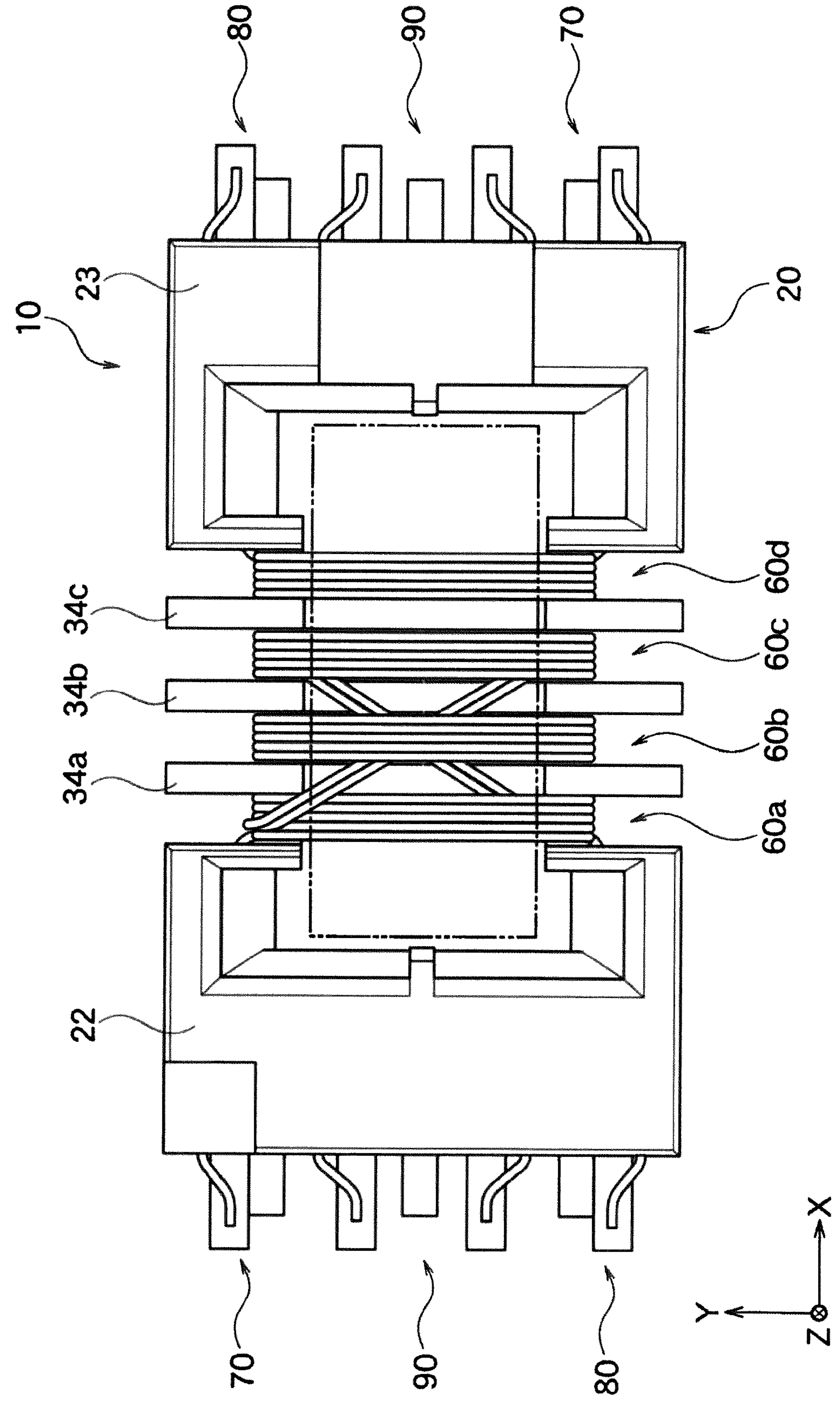
FIG. 16 is a plane view of the coil device shown in FIG. 14.
Figure 17:
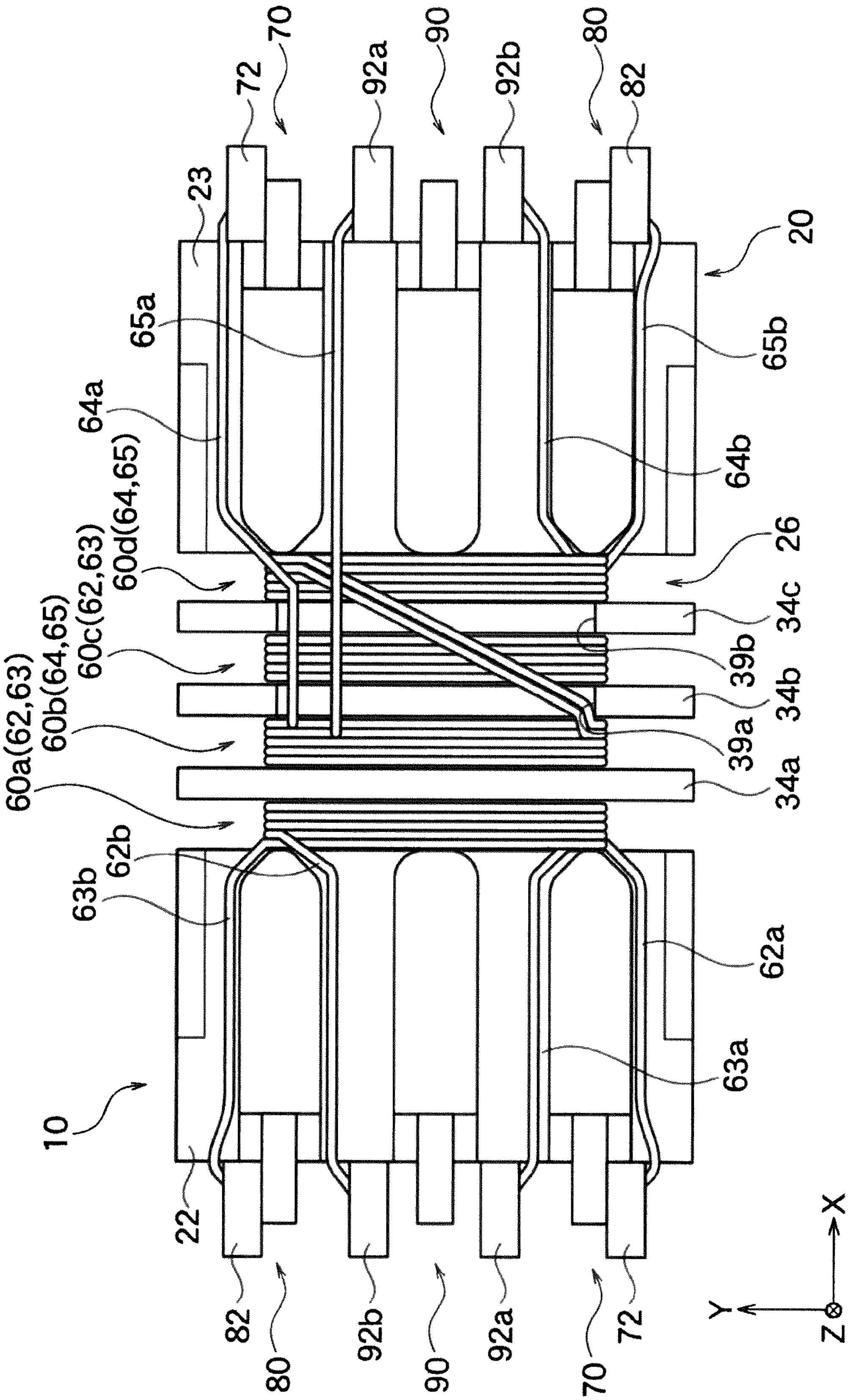
FIG. 17 is a bottom view of the coil device shown in FIG. 14.

As shown in FIG. 15 and FIG. 17, the second bobbin flange portion 34*b* is formed with a guide groove 39*a* recessed inward in the Z-axis from the outer circumferential edge. Likewise, the third bobbin flange portion 34*c* is formed with a guide groove 39*b* recessed inward in the Z-axis from the outer circumferential edge.

The second wires 64 and 65 wound in the intermediate second coil 60*b* and the second wires 64 and 65 wound in the distal second coil 60*d* are continuous via the guide grooves 39*a* and 39*b* formed at the lower ends of the bobbin flange portions 34*b* and 34*c* on the mounting side. In such a configuration, as shown in FIG. 14, the distal first coil 60*c* is sandwiched between the intermediate second coil 60*b* and the distal second coil 60*d* along the core axis (X-axis) direction of the winding core portion 42, and the coupling between the coil group consisting of the first wires 62 and 63 and the coil group consisting of the second wires 64 and 65 is further improved.

As shown in FIG. 17, the leading portions 64*b* and 65*b* of the second wires 64 and 65 wound in the distal second coil 60*d* are connected to the wire connection portions 82 and 92*b* of the terminals 80 and 90 fixed to the second terminal block 23. The leading portions 64*a* and 65*a* wound in the intermediate second coil 60*b* are connected to the wire connection portions 72 and 92*a* of the terminals 70 and 90 fixed to the second terminal block 23. The leading portions 62*a*, 63*a*, 62*b*, and 63*b* of the first wires 62 and 63 wound in the proximal first coil 60*a* are connected to the wire connection portions 72, 92*a*, 92*b*, and 82 of the terminals fixed to the first terminal block 22.

Note that, in the present embodiment, as shown in FIG. 14, the raised portions 33 are formed at the connection side portions 26*a* located between the first bobbin flange portion 34*a* and the second bobbin flange portion 34*b*, and raised portions 33*a* are also formed at the connection side portions 26*a* located between the third bobbin flange portion 34*c* and the second terminal block 23. The raised portions 33*a* are stepped raised portions having a height different from the height of the raised portions 33 in the Z-axis, but may be raised portions having the same height. Instead, the connection side portions 26*a* located between the third bobbin flange portion 34*c* and the second terminal block 23 may have the height substantially flush with the upper surface of the winding core portion 42 without forming raised portions.

Other Embodiments

The present invention is not limited to the above-mentioned embodiments and may be variously modified within the scope of the present invention.

For example, the shape of the main core 40 is not limited as long as it has a winding core portion and a core flange portion, and the main core 40 may be a so-called I-shaped core, U-shaped core, or drum-shaped core. Moreover, the number of wires 62 to 65 and the number of terminals 70, 80, and 90 are not limited. Also, the coil device of the present invention is not necessarily provided with the subcore 50.

First to Sixth Embodiments mentioned above may be embodiments in which components of other embodiments are merged with each other. For example, in Sixth Embodiment, the structures of the bobbin 20 and the coils 60*a* to 60*b* (including 60*c*) may be similar to those in any of Second to Fifth Embodiments. Like the change from First to Fifth Embodiments to Sixth Embodiment, a bobbin flange portion may be further added to the bobbin 20 of Sixth Embodiment.

Moreover, in the above-mentioned embodiments, the raised portions 33 or 33*a* are formed so as to protrude outward along the Z-axis or the Y-axis perpendicular to the X-axis, but may be formed so as to protrude outward along an axis between the Z-axis and the Y-axis. In the above-mentioned embodiments, the raised portions 33 or 33*a* are formed in a pair separated in the Y-axis direction or in the Z-axis direction at a predetermined interval, but may be formed only on one side. Even in this case, the wiring space 66 can be formed.

DESCRIPTION OF THE REFERENCE NUMERICAL

10 . . . transformer (coil device)
20 . . . bobbin
22 . . . first terminal block
23 . . . second terminal block
24, 25 . . . flange accommodation recess
24*a*, 25*a* . . . tapered inclined surface
24*b*, 25*b* . . . guide piece
26 . . . connection portion
26*a* . . . connection side portion
26*b* . . . bottom wall
33 . . . raised portion
27 . . . notch
28 . . . mounting-side convex portion
28*a* . . . side wall
29 . . . lead communication groove
30 . . . bonding recess
33 . . . raised portion
34 . . . bobbin flange portion
34*a* . . . first bobbin flange portion
34*b* . . . second bobbin flange portion
36, 37*a*, 37*b*, 38*a*, 38*b*, 39*a*, 39*b* . . . guide groove (guide portion)
40 . . . main core
42 . . . winding core portion
42*a* . . . upper surface
42*b*, 42*c* . . . side surface
42*d* . . . bottom surface
44 . . . core flange portion
50 . . . sub-core
60 . . . coil
60*a* . . . proximal first coil
60*b* . . . intermediate second coil
60*c* . . . distal first coil
60*d* . . . distal second coil
62, 63 . . . first wire
64, 65 . . . second wire
66 . . . wiring space
62*a*, 62*b*, 63*a*, 63*b* . . . leading portion
62*a*1, 62*b*1, 63*a*1, 63*b*1 . . . communication wire portion
64*a*, 64*b*, 65*a*, 65*b* . . . leading portion
70, 80, 90 . . . terminal
72, 72*a*, 82, 82*a*, 92*a*, 92*b* . . . wire connection portion
74, 74*a*, 84, 84*a*, 94 . . . embedded portion
76, 76*a*, 86, 86*a*, 96 . . . mounting portion
100 . . . connection portion

What is claimed is:

1. A coil device comprising:
a bobbin;
a main core; and
a wire,
wherein
the bobbin comprises:
a connection portion covering at least a surface of a winding core portion of the main core and wound by the wire together with the winding core portion;
a first terminal block disposed at one end of the connection portion along a first axis; and
a second terminal block disposed at the other end of the connection portion along the first axis,
the wire comprises at least:
a first wire; and
a second wire,
the bobbin comprises:
a first bobbin flange portion disposed separately from the first terminal block at a predetermined interval along the first axis; and
a second bobbin flange portion disposed separately from the first bobbin flange portion at a predetermined interval along the first axis,
the first wire is wound around the winding core portion and the connection portion located between the first terminal block and the first bobbin flange portion so as to constitute a proximal first coil,
the second wire is wound around the winding core portion and the connection portion located between the first bobbin flange portion and the second bobbin flange portion so as to constitute an intermediate second coil,
the first wire is wound around the winding core portion and the connection portion located between the second bobbin flange portion and the second terminal block or between the second bobbin flange portion and a third bobbin flange portion so as to constitute a distal first coil,
the connection portion located between the first bobbin flange portion and the second bobbin flange portion comprises a raised portion protruding along a direction perpendicular to the first axis more than the connection portion located between the first terminal block and the first bobbin flange portion, and
a communication wire portion of the first wire connecting the first wire of the proximal first coil and the first wire of the distal first coil is disposed in a wiring space formed between the second wire wound in contact with a tip of the raised portion and an outer surface of the winding core portion or the bobbin.

2. The coil device according to claim 1, wherein the raised portion protrudes along a direction perpendicular to the first axis more than the connection portion located between the second terminal block and the second bobbin flange portion.

3. The coil device according to claim 1, wherein
the second bobbin flange portion comprises a guide portion for guiding the second wire from the intermediate second coil towards the second terminal block, and
the second wire guided via the guide portion is wired in the air above the distal first coil and goes to the second terminal block.

4. The coil device according to claim 3, wherein the second wire from the intermediate second coil is connected to a second terminal attached to the second terminal block via the guide portion.

5. The coil device according to claim 4, wherein the guide portion comprises a guide groove recessed from an outer circumferential edge of the second bobbin flange portion at a position different from that of the raised portion along a circumferential direction.

6. The coil device according to claim 3, further comprising a third bobbin flange portion, wherein
the second wire is wound around the winding core portion and the connection portion located between the third bobbin flange portion and the second bobbin flange portion so as to constitute a distal second coil, and
the second wire wound in the intermediate second coil and the second wire wound in the distal second coil are continuous via the guide portion.

7. The coil device according to claim 6, wherein the second wire from the distal second coil is connected to a second terminal attached to the second terminal block.

8. The coil device according to claim 1, wherein the first wire from the proximal first coil is connected to a first terminal attached to the first terminal block.

9. The coil device according to claim 1, wherein the raised portion of the bobbin protrudes towards a mounting surface and/or an anti-mounting surface.

10. The coil device according to claim 1, wherein the raised portion of the bobbin protrudes towards a direction parallel to a mounting surface.

11. The coil device according to claim 1, wherein the main core comprises a pair of core flange portions provided at both ends along a winding axis of the winding core portion, and each of the terminal blocks is formed with a flange accommodation recess for accommodating each of the core flange portions.

12. The coil device according to claim 1, wherein the first terminal block and the second terminal block are integrally formed with the connection portion, the connection portion comprises at least a pair of connection side portions covering both sides of the winding core portion, and the first wire or the second wire is continuously wound so as to contact with an upper surface or a lower surface of the winding core portion.

13. The coil device according to claim 12, wherein the connection portion further comprises a bottom wall formed by integrating the pair of connection side portions and covering the lower surface of the winding core portion, and the first wire is continuously wound so as to contact with the pair of connection side portions and the bottom wall and contact with the upper surface of the winding core portion or an upper end of the connection side portions.

* * * * *